Aug. 5, 1969 JUNICHI TERASAKA 3,459,897

OFFICE LINE CONNECTION SYSTEM FOR PRIVATE BRANCH TELEPHONE EXCHANGE

Filed Dec. 27, 1965 12 Sheets-Sheet 4

Aug. 5, 1969 JUNICHI TERASAKA 3,459,897

OFFICE LINE CONNECTION SYSTEM FOR PRIVATE BRANCH TELEPHONE EXCHANGE

Filed Dec. 27, 1965 12 Sheets-Sheet 12

United States Patent Office 3,459,897

Patented Aug. 5, 1969

3,459,897

OFFICE LINE CONNECTION SYSTEM FOR PRIVATE BRANCH TELEPHONE EXCHANGE

Junichi Terasaka, Yokohama-shi, Japan, assignor to Fujitsu Limited, Kawasaki, Japan, a corporation of Japan Filed Dec. 27, 1965, Ser. No. 516,309

Int. Cl. H04m 3/54

U.S. Cl. 179—18 7 Claims

ABSTRACT OF THE DISCLOSURE

A private branch telephone exchange includes routing equipment connected between an office line and a plurality of subscribers' lines. The routing equipment selectively routes incoming calls on the office line to the subscribers and includes starting control equipment for routing an incoming call to the first free subscriber's line in a predetermined switching pattern.

Description of the Invention

The present invention relates to a private branch telephone exchange. More particularly, the invention relates to an office line connection system for a private branch telephone exchange.

The principal object of the present invention is to provide a new and improved office line connection system for a private branch telephone exchange.

An object of the present invention is to provide an office line connection system for a private branch telephone exchange in which subscribers are efficiently connected to the line with a minimum of operations required of the subscribers.

In accordance with the present invention a private branch telephone exchange having a plurality of subscribers each having a subscriber line and a telephone handset operatively connected to the line and an office line for transmitting incoming calls to the subscribers of the exchange, comprises routing equipment connected between the office line and the plurality of subscriber's lines for selectively routing incoming calls on the office line to the subscribers. The routing equipment includes a starting control circuit for controlling the operation of the routing equipment to route an incoming call to the first free subscriber's line in a predetermined switching pattern upon the arrival of the incoming call on the office line. The starting control circuit includes busy discriminating apparatus for determining the busy condition of the subscribers' lines in the predetermined pattern.

In order that the present invention may be readily carried into effect, it will now be described with reference to the accompanying drawings, wherein.

Figures 1, 2:
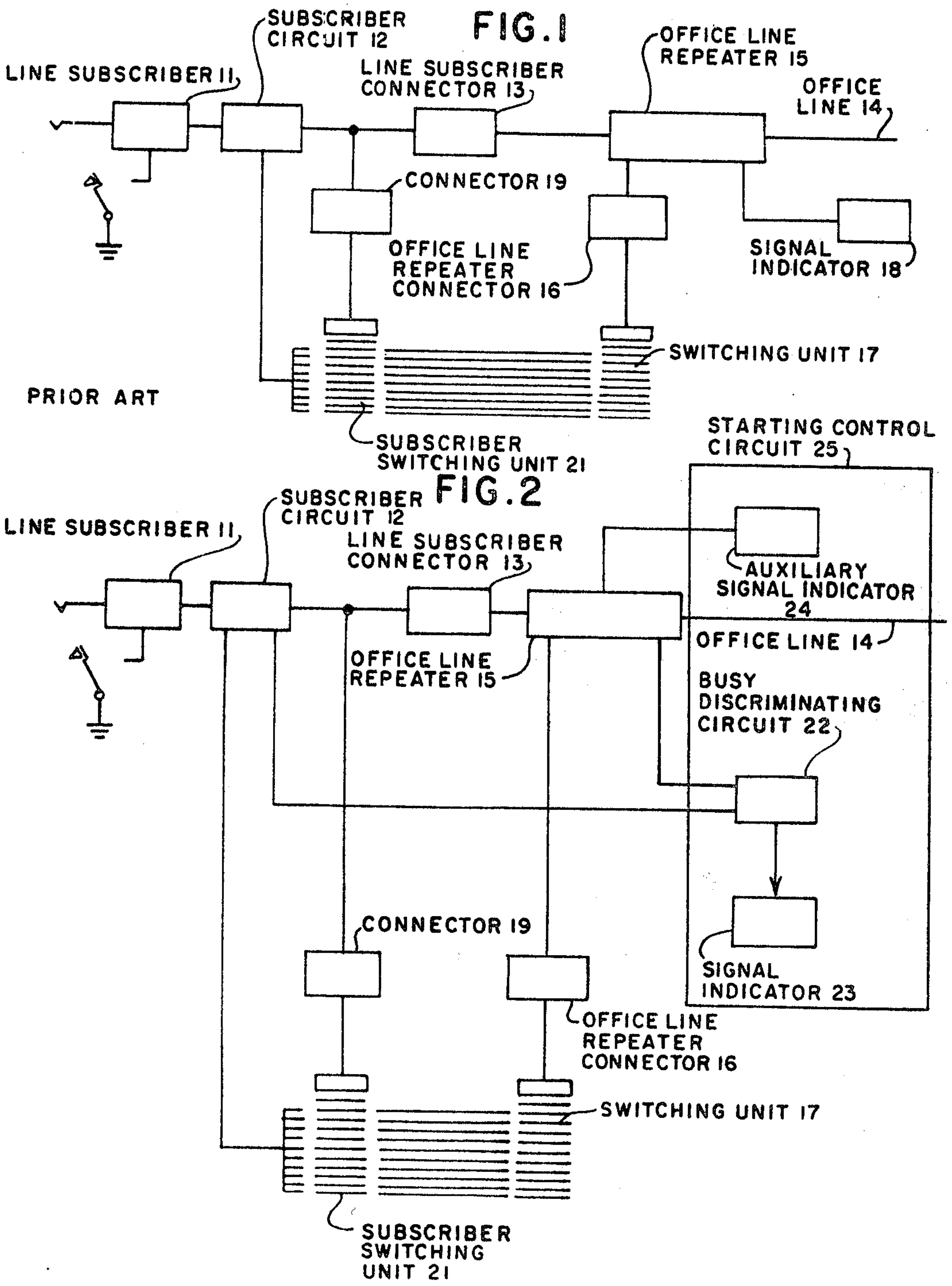
FIG. 1 is a block diagram of an embodiment of a known office line connection system for a private branch telephone exchange.
FIG. 2 is a block diagram of an embodiment of the office line connection system of the present invention for a private branch telephone exchange.
Figure 3:
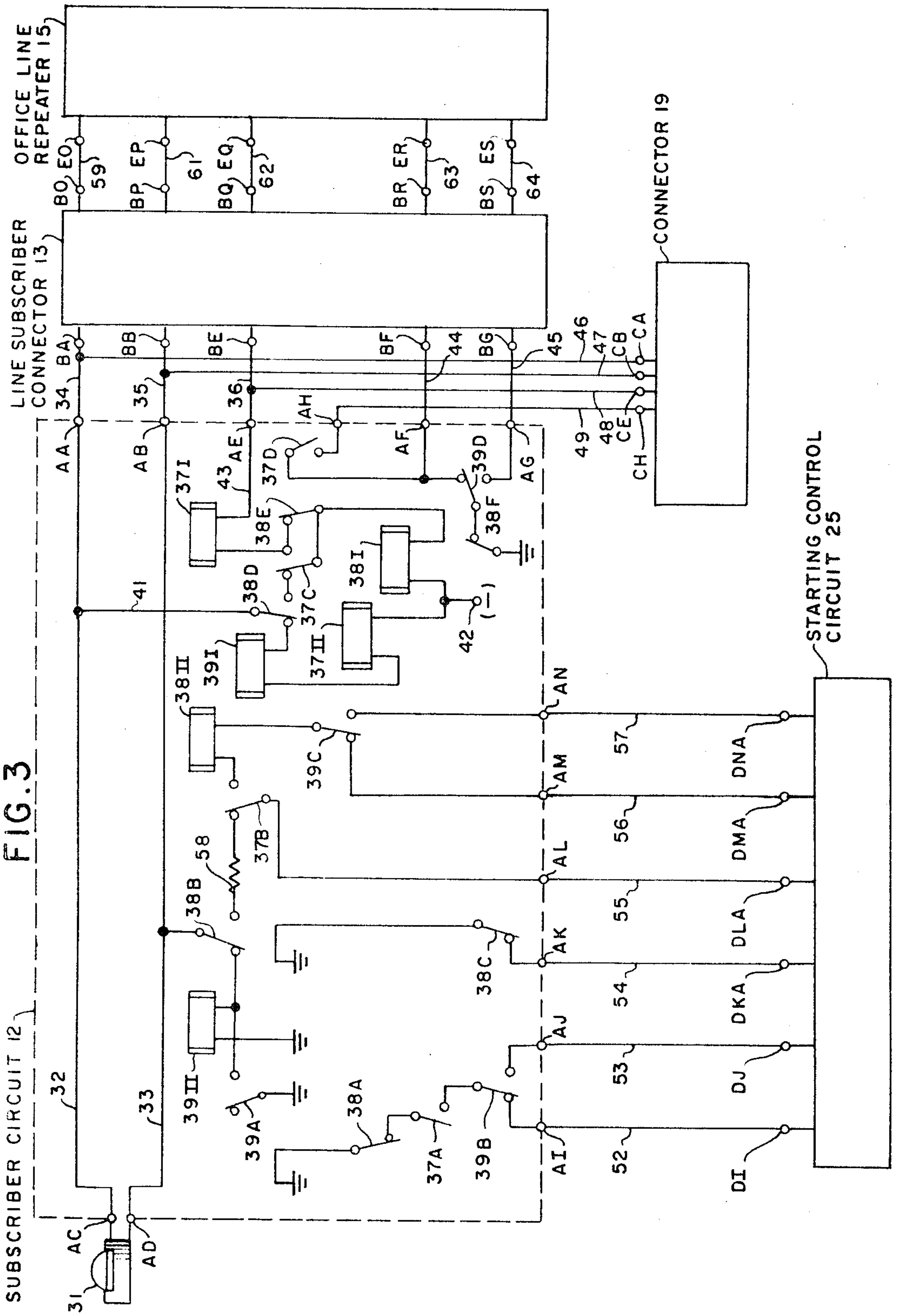
FIG. 3 is a circuit diagram of an embodiment of the subscriber circuit of the office line connection system of FIG. 2.
Figure 4A:
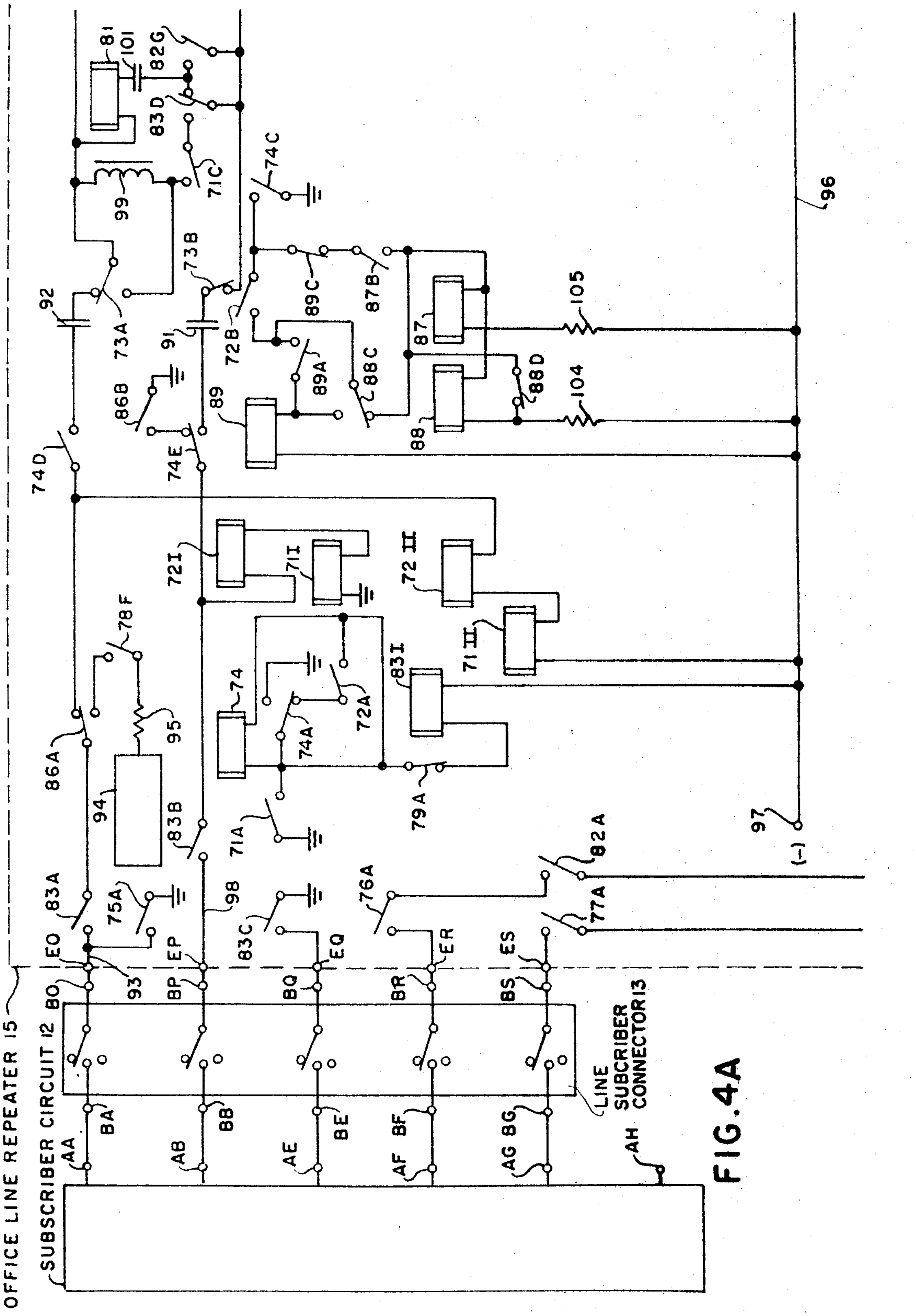
Figure 4B:
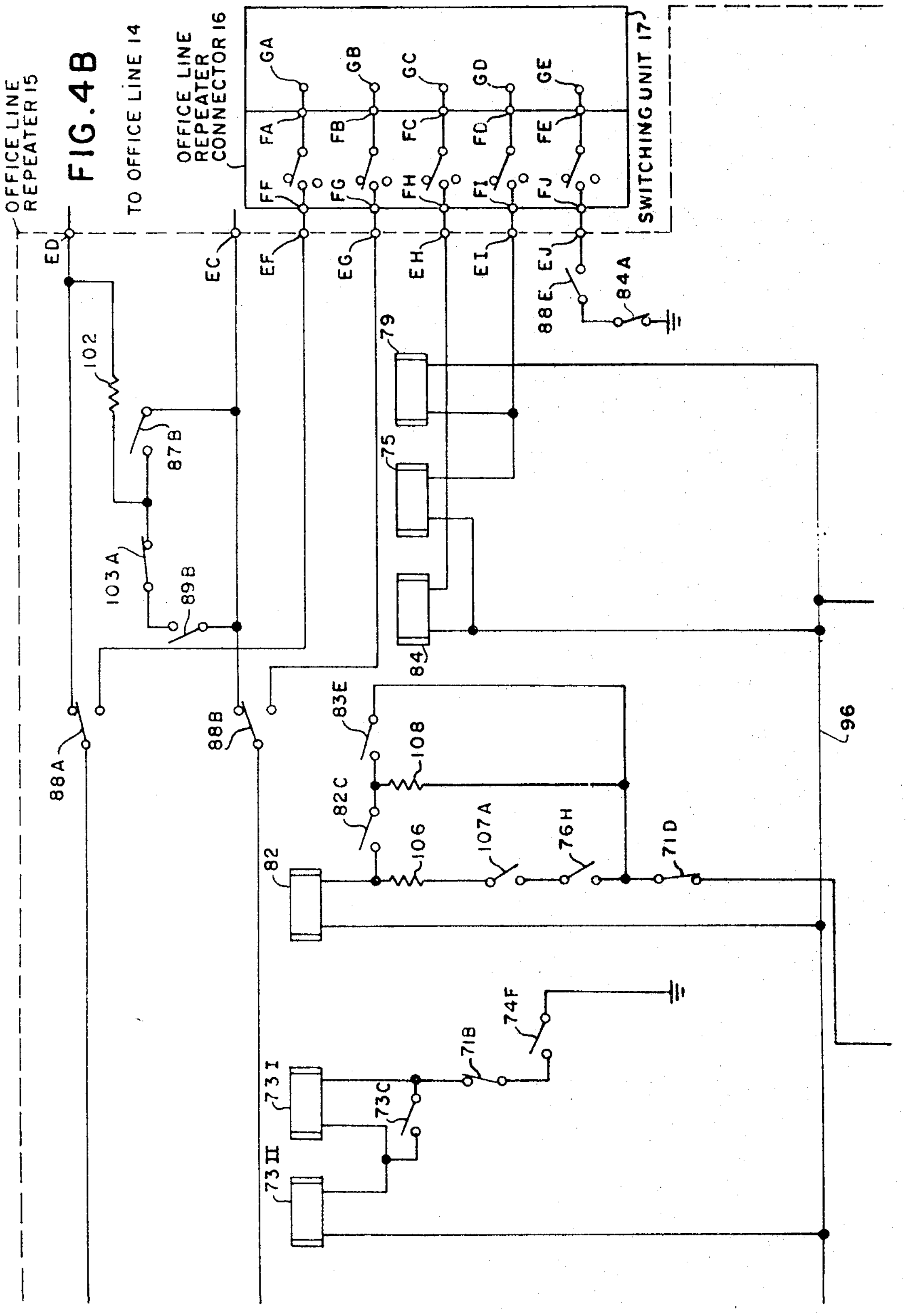
Figure 4C:
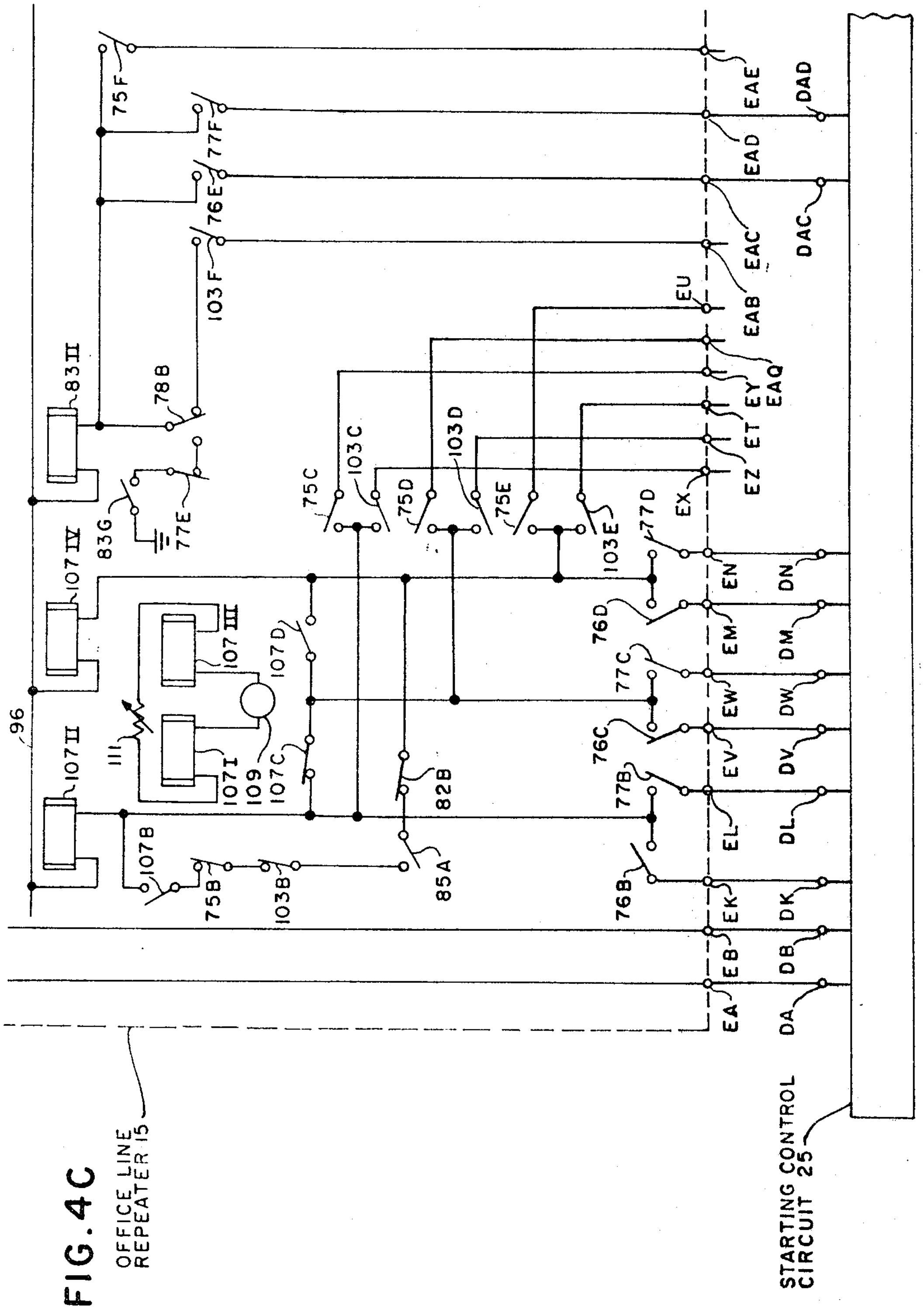
Figure 4D:
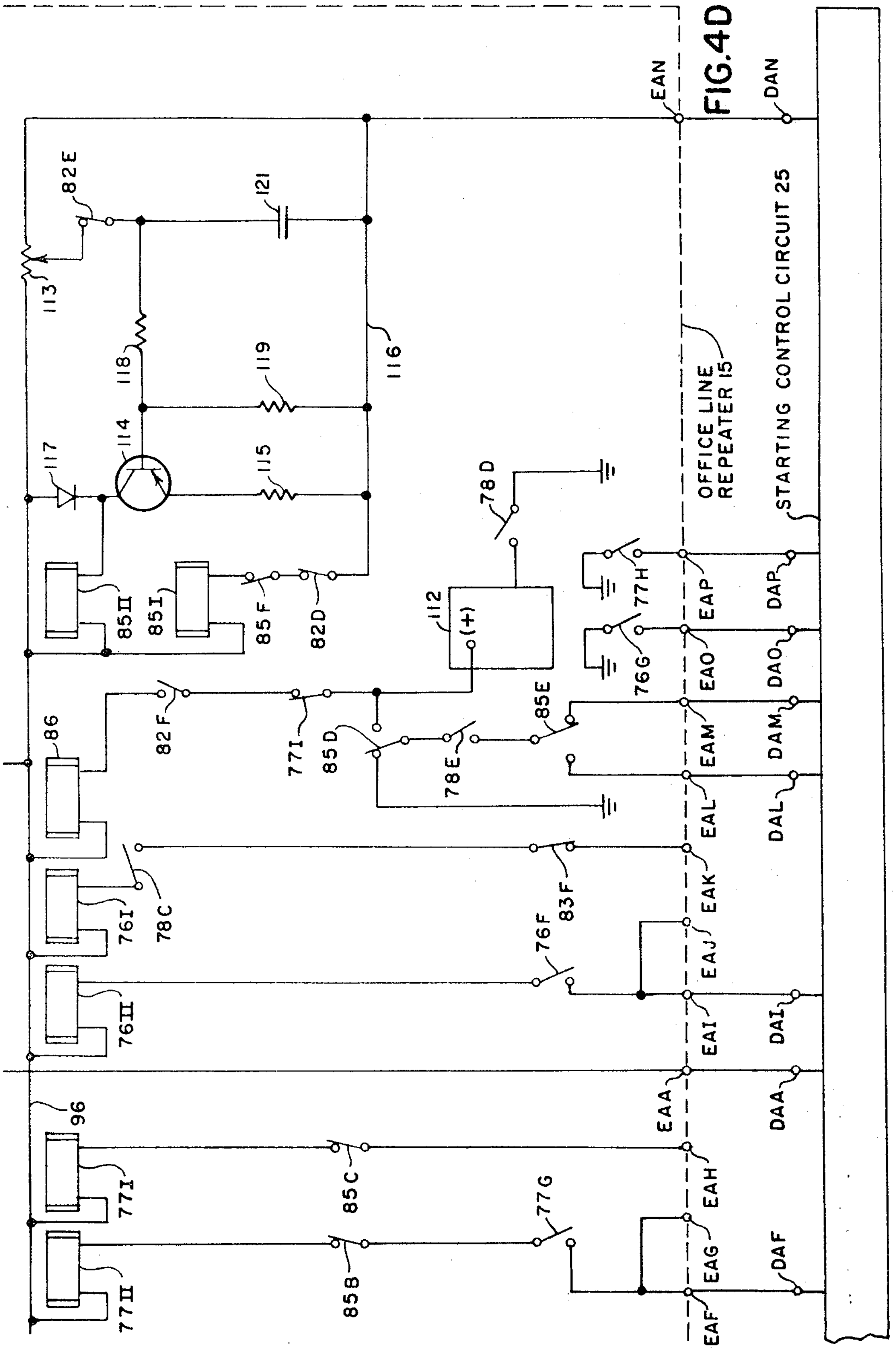
Figure 5A:
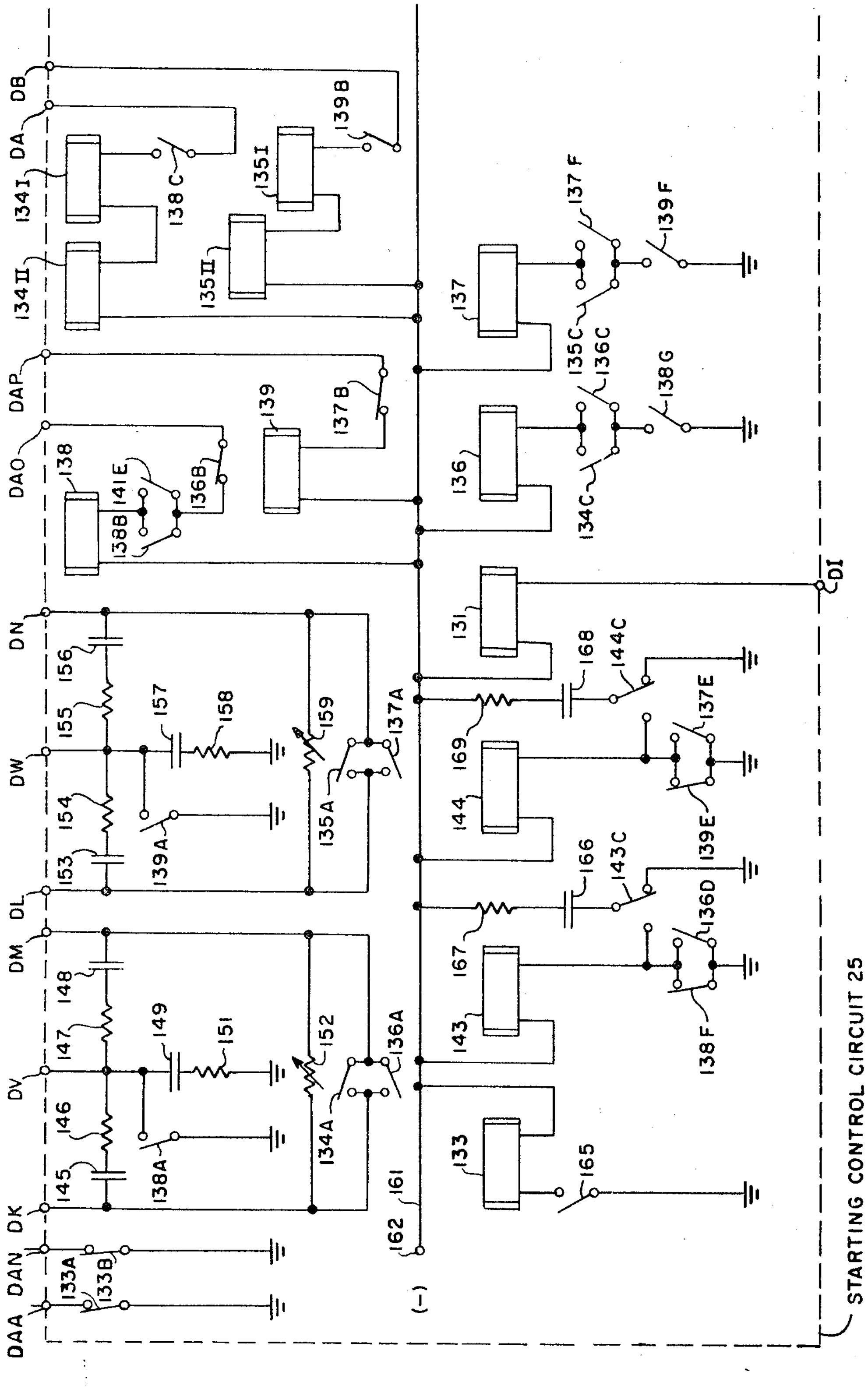
Figure 5B:
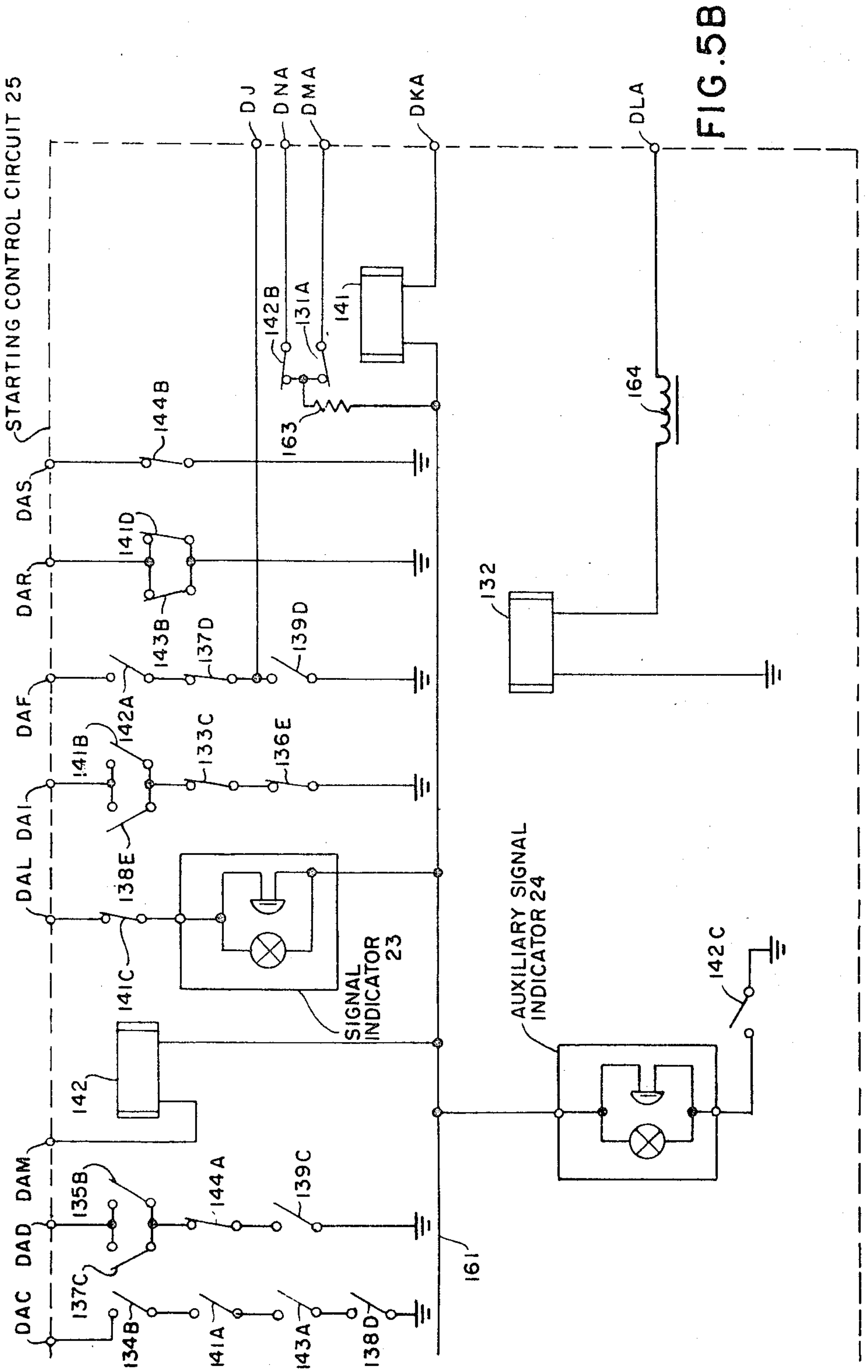
Figure 6A:
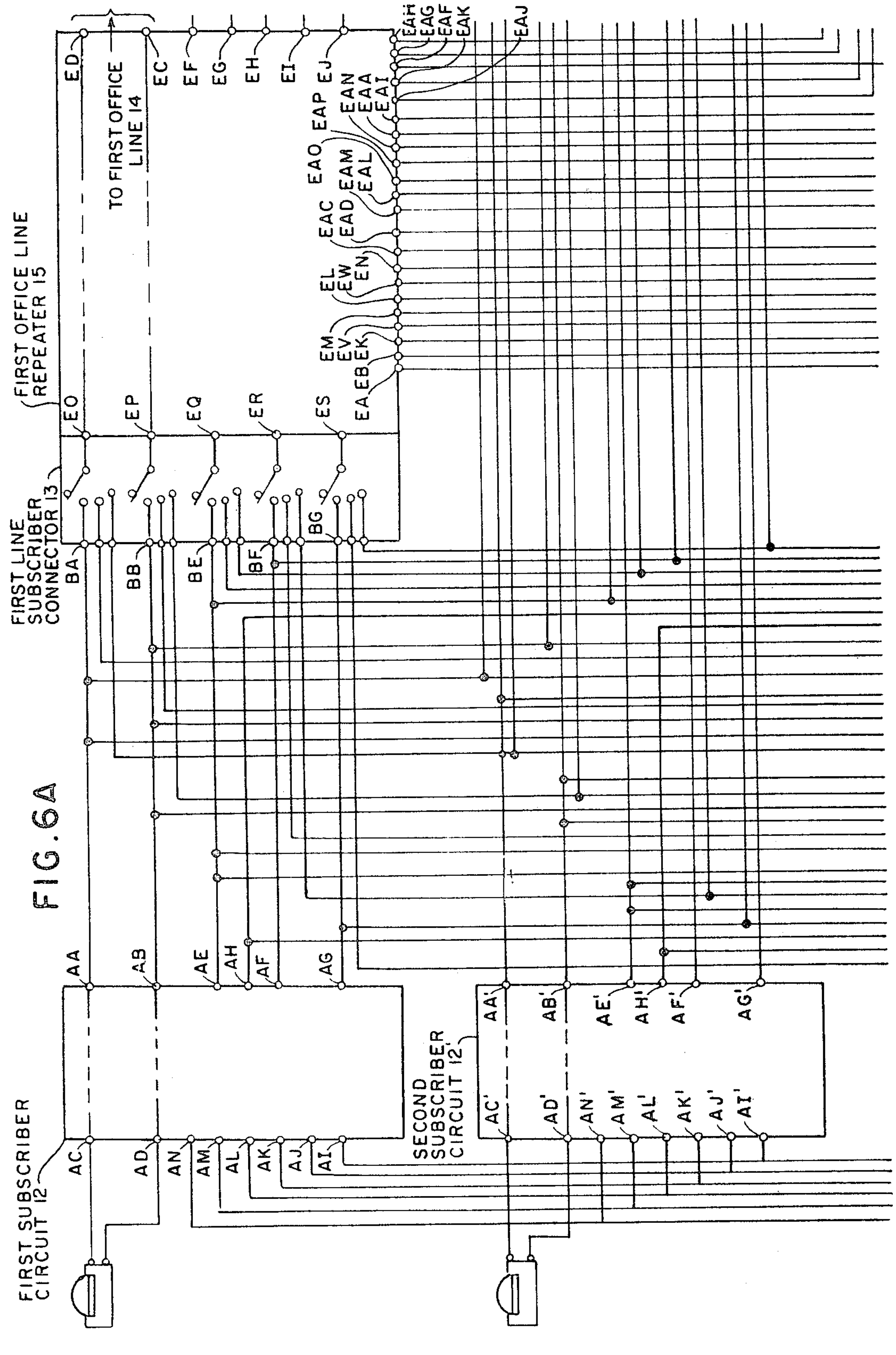
Figure 6B:
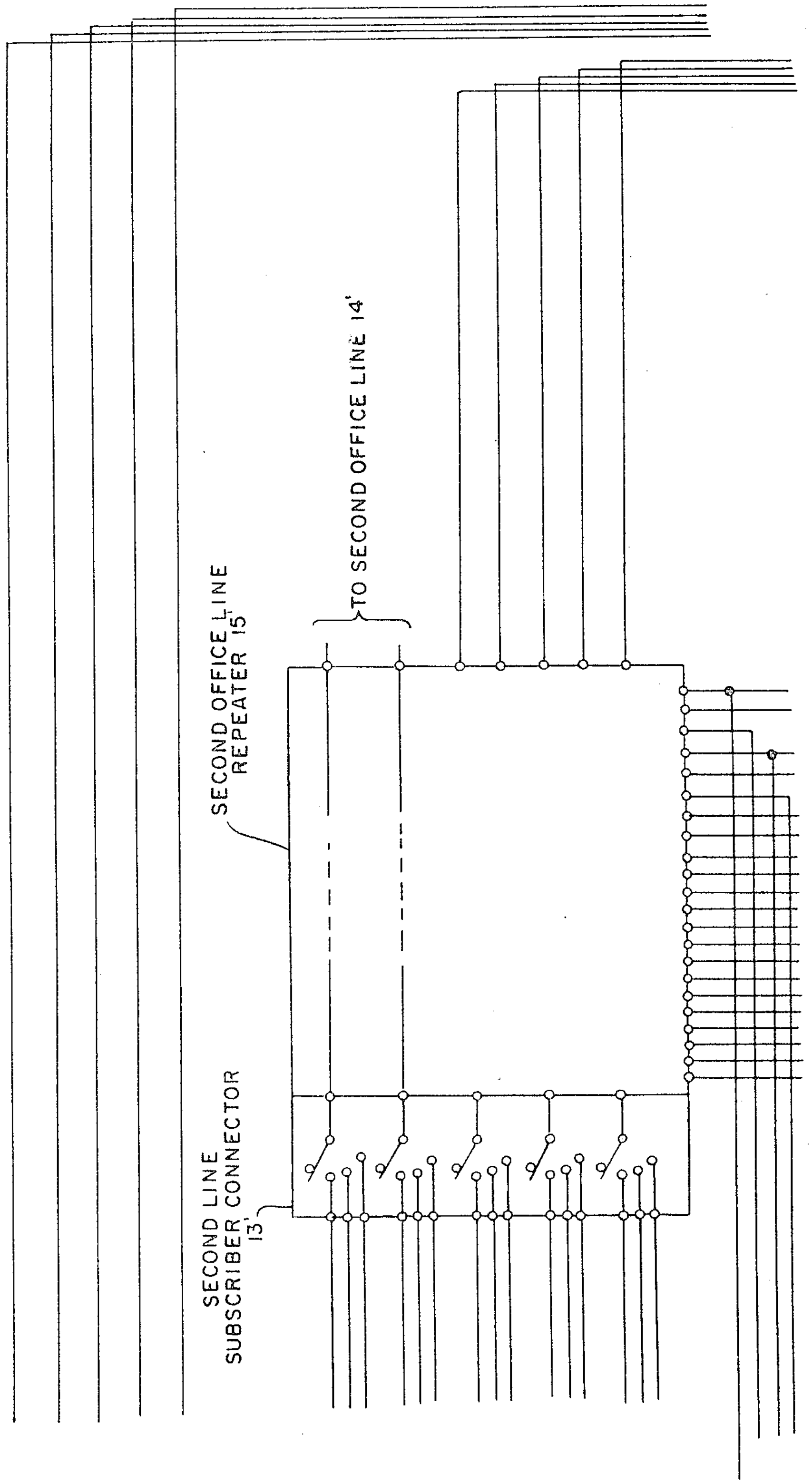
Figure 6C:
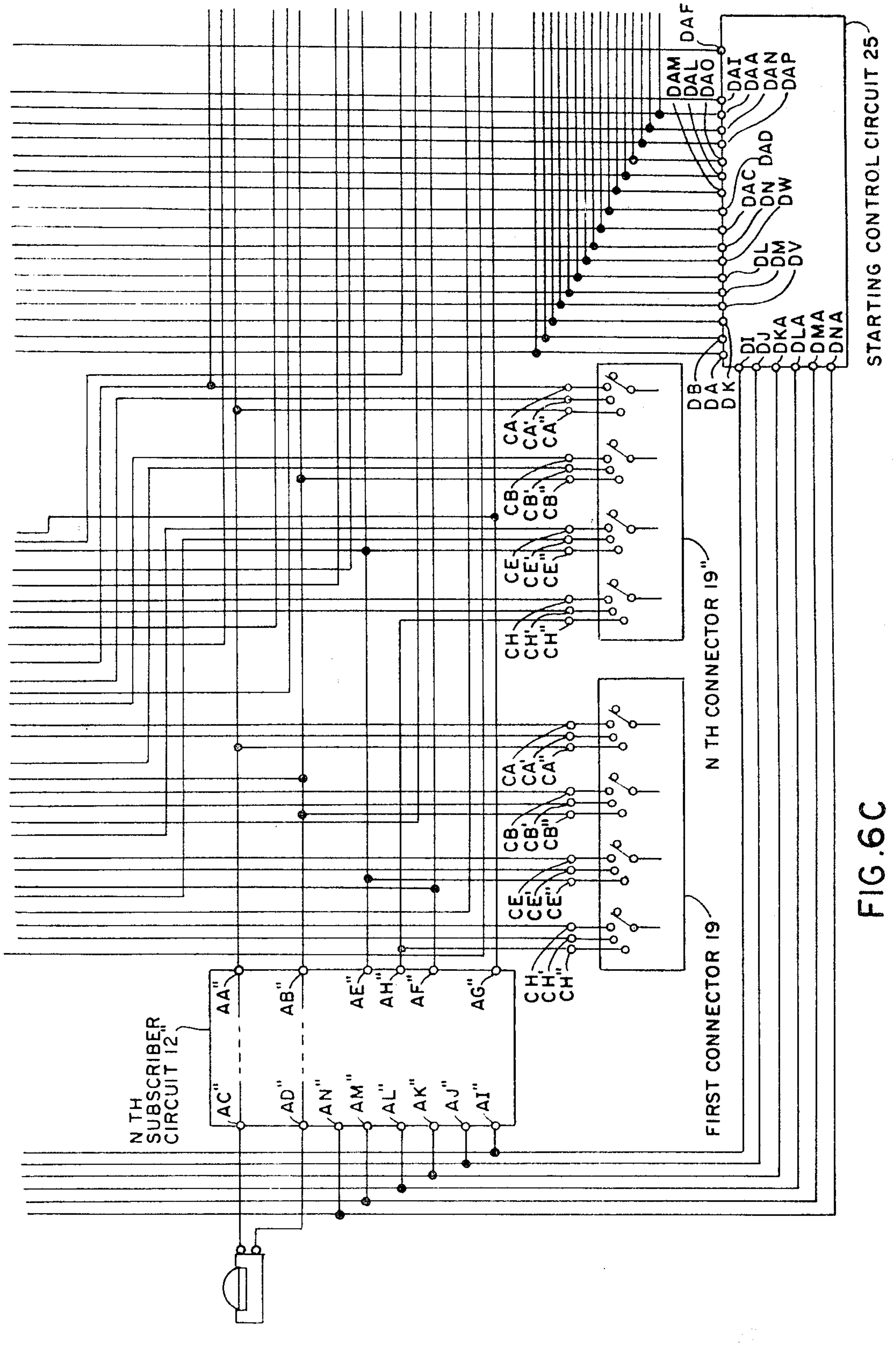
Figure 6D:
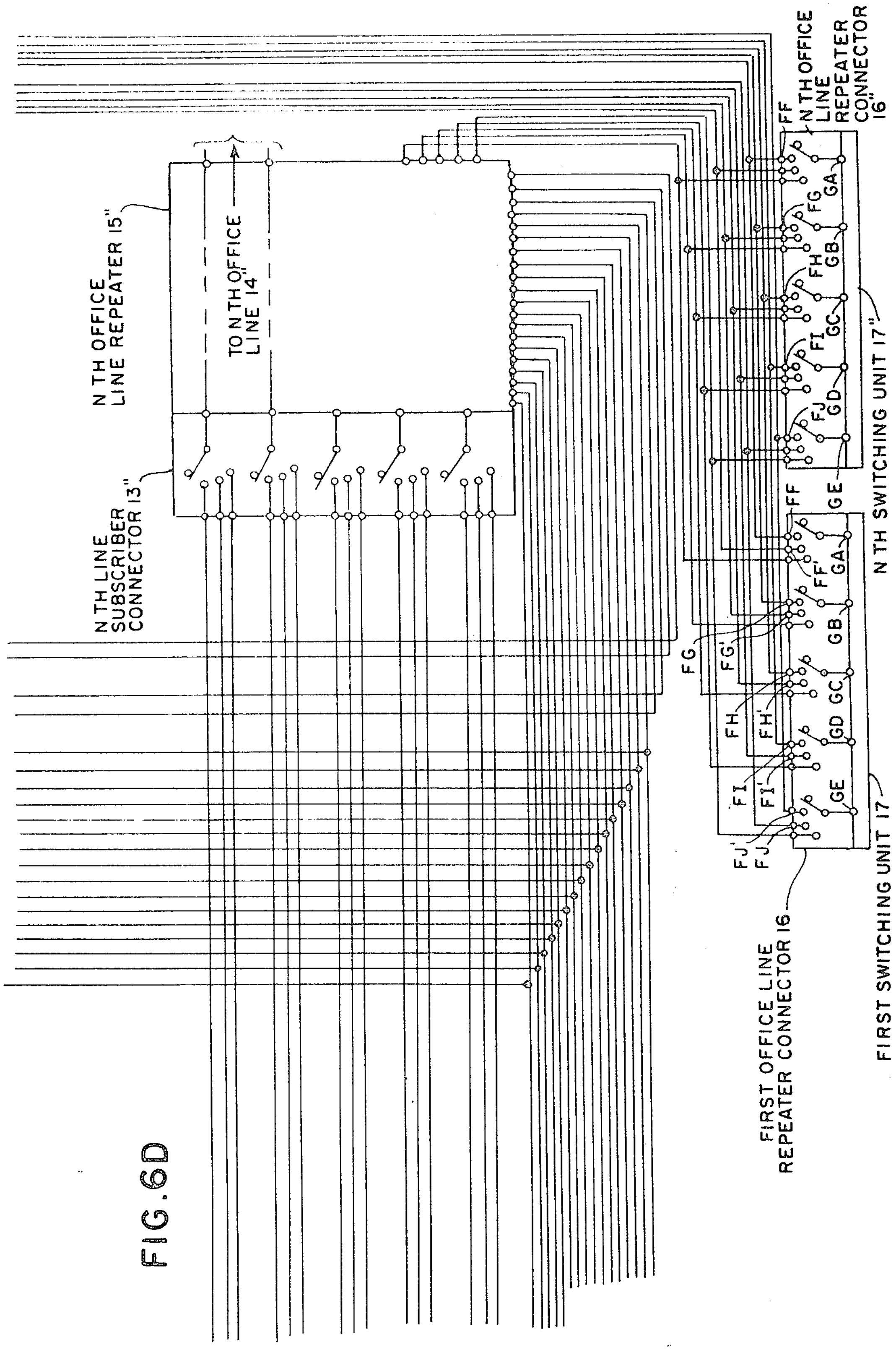

FIG. 4, which comprises FIGS. 4A, 4B, 4C and 4D, is a circuit diagram of an embodiment of the office line repeater circuit of the office line connection system of FIG. 2;

FIG. 5, which comprises FIGS. 5A and 5B, is a circuit diagram of an embodiment of the starting control circuit of the office line connection system of FIG. 2; and FIG. 6, which comprises FIGS. 6A, 6B, 6C and 6D, is a circuit diagram of the interconnected circuits of FIGS. 3, 4 and 5.

In the figures, the same components are indicated by the same reference numerals.

In FIG. 1, a private branch telephone exchange of the prior art comprises a line subscriber 11 and a subscriber circuit 12 connected to the line subscriber 11. A line subscriber connector 13 is connected to the subscriber circuit 12 and an office line 14 is connected to the line subscriber connector 13 via an office line repeater 15. An office line repeater connector 16 is connected between the office line repeater 15 and a switching unit 17. A signal indicator 18 is connected to the office line repeater 15. A connector 19 is connected between a common point in the connection between the subscriber circuit 12 and the line subscriber connector 13 and a subscriber switching unit 21. The subscriber switching unit 21 and the switching unit 17, through the subscriber switching unit 21, are connected to the subscriber circuit 12.

When there is a signal or incoming call on the office line 14 to the private branch telephone exchange, such signal is received by the office line repeater 15 which actuates the signal indicator 18. The signal indicator 18 may comprise any suitable audible or visual signalling device or devices and may be positioned to provide a common signal for a plurality of subscribers in the private branch or may be positioned to provide individual signals to each of the subscribers. The signal indicator 18 signals the presence of a signal or incoming call on the office line 14. If a subscriber 11 of the private branch actuates a switch on his telephone handset and picks up the telephone receiver, the subscriber circuit 12 is actuated and causes operation of the line subscriber connector 13. The line subscriber connector 13 selects the subscriber 11 who actuated or operated the switch on his handset and picked up the telephone receiver and connects such subscriber to the office line 14. The selected subscriber is then connected to the office line 14 for the incoming call and may engage in two-way conversation with the calling party. The signal indicator 18 is deactuated when the connection is made.

If it is necessary to transfer the incoming call on the office line 14 to a line or subscriber of the branch other than the one who picked up the call, the office line repeater 15 actuates the switching unit 17, and the other subscriber, for whom the call is intended, is selected by the office line repeater connector 16 and said switching unit 17 and is connected to the office line. The call is thus transferred to the subscriber for whom it is intended.

The known system of FIG. 1 has many shortcomings and disadvantages. The subscriber must operate a switch of pushbutton type at this telephone handset. This necessitates time, effort and inconvenience and all of these factors delay the actual connection of the subscriber for conversation. Furthermore, the provision of the common signal indication of an incoming call to each subscriber of the branch at the same time causes more than one subscriber to respond to each incoming call. Of the responding subscribers, only one will be connected to the office line, so that the others expend time and effort to no avail. If many incoming calls are received by the branch, the frequent actuation or operation of the signal indicator 18 is a disturbing influence on the subscribers, who may be a number of people working at separate desks in a single large room.

The office line connection system of the present invention eliminates the foregoing disadvantages and shortcomings of the prior art systems. This is accomplished by selection of an idle subscriber's line of the branch, when an incoming call is received on the office line, and automatic switching of the incoming call to the telephone of such idle subscriber's line. Thus, in the office line connection system of the present invention, the selected subscriber need merely pick up his telephone handset upon the operation of his signal indicator, and he is immediately connected to the office line for two-way conversation. The common signal indicator does not operate unless all the subscriber lines are busy or unless the called subscriber does not respond so that the subscribers are not disturbed and do not have to expend time and effort in responding to each call. Each subscriber of the branch thus need merely perform the same operations as he would in a private line telephone system. Furthermore, unnecessary lifting and replacing of telephone handsets is eliminated.

FIG. 2 is an embodiment of the office line connection system of the present invention. In FIG. 2, the line subscriber handset unit 11, the subscriber circuit 12, the line subscriber connector 13, the office line 14, the office line repeater 15, the office line repeater connector 16, the switching unit 17, the connector 10 and the subscriber switching unit 21 are essentially the same as the corresponding components of the system of FIG. 1. As in FIG. 1, in FIG. 2, only one line subscriber or line subscriber telephone handset 11 is indicated, whereas there are actually a plurality of such subscribers. A subscriber circuit 12 is provided for each subscriber, although only one is indicated.

In FIG. 2, a busy discriminating circuit 22 is connected between the office line repeater 15 and the subscriber circuit 12. A signal indicator 23 is connected to the busy discriminating circuit 22. The busy discriminating circuit 22 determines the busy condition of the subscriber lines and actuates the signal indicators 23, which is positioned in common for all the subscribers of the branch, when all the subscribers' lines are busy. An auxiliary signal indicator 24 is connected to the office line repeater 15 and is actuated to produce an audible or visual signal a predetermined period of time after a selected subscriber has been signalled that an incoming call is on the line and has not yet responded to such signal by picking up his handset. A starting control circuit 25 is connected between the office line repeater 15 and the subscriber circuit 12 and functions to control the starting operation of the system. The various connector, switching and repeater units are all any suitable known telephone equipment, as are the handsets and signal indicators.

Upon the arrival of an incoming call on the office line 14 in FIG. 2, the office line repeater 15 is operated. The office line repeater 15 actuates the busy discriminating circuit 22, which determines whether or not all the subscribers' lines are busy. If a subscriber line is not busy, the busy discriminating circuit 22 indicates such fact to the appropriate usual equipment which operates the line subscriber connector 13 to select a subscriber whose line is not busy. The line subscriber connector 13 connects the subscriber circuit 12 of such subscriber to the office line 14, so that the selected subscriber 11 is connected to the office line for the incoming call and may engage in two-way conversation with the calling party as soon as the selected subscriber picks up his telephone receiver in response to the signal indication at his handset and thereby actuates his subscriber circuit. If the selected subscriber wishes to transfer the call to another subscriber, he signals the office line repeater 15, which operates the switching unit 17 and the subscriber switching unit 21 via the office line repeater connector 16 and appropriate usual equipment to connect the calling party with the other subscriber.

When an incoming call arrives on the office line 14 at a time when all the subscribers' lines are busy, the busy discriminating circuit 22 determines that all the subscribers' lines are busy and actuates the signal indicator 23, which is included in the starting control circuit 25, to indicate to all the subscribers that an incoming call is on the office line 14. If, in response to the common signal indicator indication, a subscriber replaces his telephone handset, the signal indicator 23 is made inoperative by the busy discriminating circuit 22 which then indicates the fact that a subscriber's line is not busy and operates the line subscriber connector 13 via the appropriate usual equipment to select the subscriber whose line is not busy.

If there is an incoming call on the office line repeater 15, and a signal indication is provided at the handset of a subscriber whose line is not busy, and a predetermined time elapses without response by the signalled subscriber, the auxiliary signal indicator 24, which is included in the starting control circuit 25, is actuated by suitable known timer circuit or equipment to provide a suitable signal indication. The auxiliary signal indicator 24 is positioned in common for all the subscribers. If a subscriber whose line is not busy then signals, in any suitable manner, that he will accept the incoming call, he closes a circuit from his subscriber circuit 12 to the office line repeater 15 and he may then engage in two-way conversation with the calling party.

FIGS. 3, 4, 5 and 6 disclose ciruitry which may be utilized as the various components of FIG. 2. In FIG. 3, which is a subscriber circuit 12, the subscriber's telephone handset 31 is connected via leads 32 and 33 to the circuit. The line subscriber connector 13 is connected to the circuit via leads 34, 35 and 36. The subscriber circuit of FIG. 3 comprises a differential relay 37 having a pair of energizing windings 37I and 37II and a plurality of armatures or switches 37A, 37B, 37C and 37D, a differential relay 38 having a pair of energizing windings 38I and 38II and a plurality of armatures or switches 38A, 38B, 38C, 38D, 38E and 38F, and a differential relay 39 having a pair of energizing windings 39I and 39II and a plurality of armatures or switches 39A, 39B, 39C and 39D.

The lead 34 is connected to the lead 32 via a terminal AA and the lead 35 is connected to the lead 33 via a terminal AB, A lead 41 is connected to a point 42 of negative potential via the switch 38D, the relay winding 39I and the relay winding 37II. The lead 36 is connected to a lead 43 which is connected to the point 42 of negative potential via the relay winding 37I, the switch 38E and the relay winding 38I. The switch 37C is connected between the leads 41 and 43 in a manner whereby when the switch 38D is in its position opposite that shown in FIG. 3 and the switch 37C is in its position shown in FIG. 3, the lead 41 is connected to the point 42 of negative potential via the switch 38D, the switch 37C and the relay winding 38I. When the switch 37C is in its position opposite that shown in FIG. 3 and the switch 38E is in its position opposite that shown in FIG. 3, the lead 43 is connected to the point 42 of negative potential.

The lead 32 extends from a terminal AC to which the telephone handset 31 is connected to the terminal AA to which the line subscriber connector 13 is connected via the lead 34. The lead 33 extends from a terminal AD to which the telephone handset 31 is connected to the terminal AB to which the line subscriber connector 13 is connected via the lead 35. The lead 36 is connected to the lead 43 via a terminal AE. The lead 34 is connected to the line subscriber connector 13 via a terminal BA of said line subscriber connector. The lead 35 is connected to the line subscriber connector 13 via a terminal BB of said line subscriber connector. The lead 36 is connected to the line subscriber connector 13 via a terminal BE of said line subscriber connector 13.

A lead 44 connects a terminal AF of the subscriber circuit 12 to a terminal BF of the line subscriber connector 13 and a lead 45 connects a terminal AG of the subscriber circuit 12 to a terminal BG of the line subscriber connector 13. The lead 34 is connected to the connector 19 via a lead 46 and a terminal CA. The lead 35 is connected to the connector 19 via a lead 47 and a terminal CB. The lead 36 is connected to the connector 19 via a lead 48 and a terminal CE. A terminal AH of the subscriber circuit 12 is connected to a terminal CH of the connector 19 via a lead 49.

The lead 49 from the connector 19 is connected via the terminal AH to a point at ground potential via the switch 37D, the switch 39D and the switch 38F when the switch 37D is in its position opposite that shown in FIG. 3 and the switches 39D and 38F are in their positions shown in FIG. 3. The lead 44 from the line subscriber connector 13 is connected via the terminal AF to the point at ground potential via the switches 39D and 38F when said switches are in their positions shown in FIG. 3. The lead 45 from the line subscriber circuit is connected via the terminal AG to the point at ground potential via the switches 39D and 38F when the switch 39D is in its position opposite that shown in FIG. 3 and when the switch 38F is in its position shown in FIG. 3.

The starting control circuit 25 is connected to the subscriber circuit 12 via leads 52, 53, 54, 55, 56 and 57. The lead 52 is connected between a terminal AI of the subscriber circuit 12 and a terminal DI of the starting control circuit 25. The lead 53 is connected between a terminal AJ of the subscriber circuit 12 and a terminal DJ of the starting control circuit 25. The lead 54 is connected between a terminal AK of the subscriber circuit 12 and a terminal DKA of the starting control circuit 25. The lead 55 is connected between a terminal AL of the subscriber circuit 12 and a terminal DLA of the starting control circuit 25. The lead 56 is connected between a terminal AM of the subscriber circuit 12 and a terminal DMA of the starting control circuit 25. The lead 57 is connected between a terminal AN of the subscriber circuit 12 and a terminal DNA of the starting control circuit 25.

The lead 52 from the starting control circuit 25 is connected via the terminal AI to a point at ground potential via the switch 39B, the switch 37A and the switch 38A when the switches 39B and 38A are in their positions shown in FIG. 3 and when the switch 37A is in its position opposite that shown in FIG. 3. The lead 53 from the starting control circuit 25 is connected via the terminal AJ to the point at ground potential via the switch 39B, the switch 37A and the switch 38A when the switches 39B and 37A are in their positions opposite those shown in FIG. 3 and when the switch 38A is in its position shown in FIG. 3. The lead 54 from the starting control circuit 25 is connected via the terminal AK to a point at ground potential via the switch 38C when said switch is in its position shown in FIG. 3.

The lead 55 from the starting control circuit 25 is connected via the terminal AL to the lead 33 via the switch 37B, a resistor 58 and the switch 38B when the switch 37B is in the position shown in FIG. 3 and when the switch 38B is in the position opposite that shown in FIG. 3. When the switch 38B is in its position shown in FIG. 3, the lead 33 is connected to a point at ground potential via the relay winding 39II. When the switch 38B is in its position shown in FIG. 3 and when the switch 39A is in its position opposite that shown in FIG. 3, the lead 33 is connected directly to the point at ground potential.

The lead 56 from the starting control circuit 25 is connected via the terminal AM to the lead 55 from said starting control circuit via the switch 39C, the relay winding 38II and the switch 37B when the switch 39C is in its position shown in FIG. 3 and when the switch 37B is in its position opposite that shown in FIG. 3. The lead 57 from the starting control circuit 25 is connected via the terminal AN to the lead 55 from said starting control circuit via the switch 39C, the relay winding 38II and the switch 37B when the switches 39C and 37B are in their positions opposite those shown in FIG. 3.

A terminal BO of the line subscriber connector 13 is connected to a terminal EO of the office line repeater 15 via a lead 59. A terminal BP of the line subscriber connector 13 is connected to a terminal EP of the office line repeater 15 via a lead 61. A terminal BQ of the line subscriber connector 13 is connected to a terminal EQ of the office line repeater 15 via a lead 62. A terminal BR of the line subscriber connector 13 is connected to a terminal ER of the office line repeater 15 via a lead 63. A terminal BS of the line subscriber connector 13 is connected to a terminal ES of the office line repeater 15 via a lead 64.

In FIG. 4, which is an office line repeater 15, the terminals BA, BB, BE, BF and BG of the line subscriber connector 13 are connected to the subscriber circuit 12 and the terminals BO, BP, BQ, BR and BS of said line subscriber circuit are connected to the terminals EO, EP, EQ, ER and ES of the office line repeater. The office line repeater of FIG. 4 comprises a current supply differential relay 71 having a pair of energizing windings 71I and 71II and a plurality of armatures or switches 71A, 71B, 71C and 71D, an operation differential relay 72 having a pair of energizing windings 72I and 72II and a plurality of armatures or switches 72A and 72B, an operation differential relay 73 having a pair of energizing windings 73I and 73II and a plurality of armatures or switches 73A, 73B and 73C, a holding relay 74 having an energizing winding 74 and a plurality of armatures or switches 74A, 74B, 74C, 74D, 74E and 74F, a transfer relay 75 having an energizing winding 75 and a plurality of armatures or switches 75A, 75B, 75C, 75D, 75E and 75F, a selection, delayed release, differential relay 76 having a pair of energizing windings 76I and 76II and a plurality of armatures or switches 76A, 76B, 76C, 76D, 76E, 76F, 76G, and 76H, a selection, delayed release, differential relay 77 having a pair of energizing windings 77I and 77II and a plurality of armatures or switches 77A, 77B, 77C, 77D, 77E, 77F, 77G, 77H and 77I, a signal holding, delayed release relay 78 having an energizing winding and a plurality of armatures or switches 78A, 78B, 78C, 78D, 78E and 78F, an information relay 79 having an energizing winding 79 and an armature or switch 79A, a call signal relay 81 having an energizing winding 81 and an armature or switch 81A, a two-step relay 82 having an energizing winding 82, first step armatures or switches 82A, 82B and 82C and second step armatures or switches 82D, 82E, 82F and 82G, a connection differential relay 83 having a pair of energizing windings 83I and 83II and a plurality of armatures or switches 83A, 83B, 83C, 83D, 83E, 83F and 83G, a cutoff delayed release relay 84 having an energizing winding 84 and an armature or switch 84A, a timer differential relay 85 having a pair of energizing windings 85I and 85II and a plurality of armatures or switches 85A, 85B, 85C, 85D, 85E and 85F, a signal interrupted relay 86 having an energizing winding 86 and a pair of armatures or switches 86A and 86B, a switching relay 87 having an energizing winding 87 and a pair of armatures or switches 87A and 87B, a switching relay 88 having an energizing winding 88 and a plurality of armatures or switches 88A, 88B, 88C, 88D and 88E and a switching relay 89 having an energizing winding 89 and a plurality of armatures or switches 89A, 89B and 89C.

In FIG. 4, the terminal ES is connected to a terminal EA via the switch 77A when said switch is in its position opposite that shown in FIG. 4. The terminal ER is connected to a terminal EB via the switches 76A and 82A when said switches are in their positions opposite those shown in FIG. 4. The terminal EQ is connected to a point at ground potential via the switch 83C when said switch is in its position opposite that shown in FIG. 4. The terminal EP is connected to a terminal EC via the switches 83B and 74E, a capacitor 91 and the switches 73B and 88B, when the switches 83B and 74E are in their positions opposite those shown in FIG. 4 and the switches 73B and 88B are in their positions shown in FIG. 4. The terminal EO is connected to a terminal ED via the switches 83A, 86A and 74D, a capacitor 92 and the switches 73A and 88A, when the switches 83A and 74D are in their positions opposite those shown in FIG. 4 and the switches 86A, 73A and 88A are in their positions shown in FIG. 4.

The lead 93 between the terminals EO and ED is connected to a point at ground potential via the switch 75A when said switch is in its position opposite that shown in FIG. 4. The lead 93 is connected to signal equipment 94 via the switches 86A and 78F and a resistor 95, when said switches are in their positions opposite those shown in FIG. 4. The lead 93 is connected to a negative potential lead 96, which is connected to a source 97 of negative potential, via the relay windings 72II and 71II. The terminal ED of the lead 93 is connected directly to the lead 98 between the terminals EP and EC via the switches 73A, 71C and 83D when each of said switches is in its position opposite that shown in FIG. 4. A reactance or coil 99 is connected between the leads 93 and 98 via the switches 71C and 83D when these switches are in their positions opposite those shown in FIG. 4. When the switch 73A is in its position opposite that shown in FIG. 4 it short-circuits the coil 99. The lead 93 is connected to the lead 98 via the relay winding 81, the capacitor 101 and the switch 83D when said switch is in its position shown in FIG. 4. The lead 93 is connected to the lead 98 via the relay winding 81, the capacitor 101 and the switch 82G when said switch is in its position opposite that shown in FIG. 4. The terminal EO is connected to a terminal EF via the switches 83A, 86A and 74D, the capacitor 92 and the switches 73A and 88A, when the switches 83A, 74D and 88A are in their positions opposite those shown in FIG. 4 and the switches 86A and 73A are in their positions shown in FIG. 4. The lead 93 is connected to the lead 98 via a resistor 102, a switch 103A of a relay 103 of equipment not shown in FIG. 4, and the switch 89B, when the switch 103A is in its position shown in FIG. 4 and the switch 89B is in its position opposite that shown in FIG. 4. The relay 103 has armatures or switches 103A, 103B, 103C, 103D, 103E and 103F. The lead 93 is connected to the lead 98 via the resistor 102 and the switch 87B when said switch is in its position opposite that shown in FIG. 4.

The lead 98 is connected to a point at ground potential via the relay windings 72I and 71I. The terminal EP is connected to a terminal EG via the switches 83B and 74E, the capacitor 91 and the switches 73B and 88B, when the switches 83B, 74E and 88B are in their positions opposite those shown in FIG. 4 and the switch 73B is in the position shown in FIG. 4. The negative potential lead 96 is connected to a point at ground potential via the relay winding 78, either the switch 78A or 81A, and the switch 74B, when the switch 74B is in its position shown in FIG. 4 and the switches 78A and 81A are, or either of them is, in the position opposite that shown in FIG. 4. The lead 96 is connected to a point at ground potential via the relay winding 83I, the switch 79A, the relay winding 74 and the switch 71A, when the switch 79A is in its position shown in FIG. 4 and the switch 71A is in its position opposite that shown in FIG. 4. The relay winding 83I, the switch 79A and the relay winding 74 are connected to a point at ground potential via the switch 74A when the switch 74A is in its position opposite that shown in FIG. 4. The relay winding 74 is short-circuited by the switches 74A and 72A when the switch 74A is in its position shown in FIG. 4 and the switch 72A is in its position opposite that shown in FIG. 4, and the lead 96 is then connected to the point at ground potential via the relay winding 83I, the switch 79A, the switch 72A, the switch 74A and the switch 71A, when the switch 71A is in its position opposite that shown in FIG. 4.

The lead 95 is connected back to itself via the relay winding 89, the switch 89A, the switch 88C, the switch 88D and a resistor 104, or via the relay winding 89, the switch 89A, the switch 88C, the relay winding 88 and the resistor 104, or via the relay winding 89, the switch 89A, the switch 88C, the relay winding 87 and a resistor 105, or via the relay winding 89, the switch 89A, the switch 72B, the switch 89C, the switch 87B and either the relay winding 88 and the resistor 104 or the relay winding 87 and the resistor 105. The lead 96 is connected to a point at ground potential via the relay winding 89, the switch 88C, the switch 72B and the switch 74C, when each of these switches is in its position other than that shown in FIG. 4. The lead 96 is connected to a point at ground potential via the resistor 104, the relay winding 88, the switch 87B, the switch 89C and the switch 74C, or via the resistor 105, the relay winding 87, the switch 87B, the switch 89C and the switch 74C, when the switch 89C is in its position shown in FIG. 4 and when the switches 87B and 74C are in their positions opposite those shown in FIG. 4.

The lead 96 is connected to a point at ground potential via the relay winding 73II, the relay winding 73I, the switch 71B and the switch 74F, when the switch 71B is in its position shown in FIG. 4 and the switch 74F is in its position opposite that shown in FIG. 4. The relay winding 73I is short-circuited by a switch 73C. The lead 96 is connected to the starting control circuit 25 via the relay winding 82, a resistor 106, the armature or switch 107A of the four energizing windings 107I, 107II, 107III and 107IV of a rotary motor-driven electromagnetic switch 107, the switch 76H, the switch 71D, a terminal EAA of the office line repeater 15 and a terminal DAA of said starting control circuit, when the switches 107A and 76H are in their positions opposite those shown in FIG. 4 and the switch 71D is in its position shown in FIG. 4. The motor-driven rotary switch 107 has four armatures or switches 107A, 107B, 107C and 107D. The lead 96 is also connected to the terminal DA of the starting control circuit 25 via the relay winding 82, the resistor 106, the switch 107A, the switch 76H, a resistor 108, the switch 83E and the switch 71D, when the switches 107A, 76H and 83E are in their positions opposite those shown in FIG. 4 and the switch 71D is in the position shown in FIG. 4.

The lead 96 is connected to a terminal EH via the relay winding 84 and to a terminal EI via the relay winding 75 or the relay winding 79. A terminal EJ is connected to a point at ground potential via switches 88E and 84A when the switch 88E is in its position opposite that shown in FIG. 4 and the switch 84A is in its position shown in FIG. 4. The lead 96 is connected to a terminal EK via the electromagnet 107II and the switch 76B when said switch is in its position opposite that shown in FIG. 4. The electromagnet 107II is connected to a terminal EL via the switch 77B when said switch is in its position opposite that shown in FIG. 4. The electromagnet 107II is connected to a terminal EM via the switches 107B, 75B, 103B, 85A, 82B and 76D, or via the switches 107B, 75B, 103B, 85A, 82B and 77D, when the switches 75B, 103B and 82B are in their positions shown in FIG. 4 and the switches 107B, 85A and 76D or 77D are in their positions opposite those shown in FIG. 4. The electromagnet 107II is connected to a terminal ET via the switches 107B, 75B, 103B, 85A, 82B and 103E when the switch 103E is in its position opposite that shown in FIG. 4, and to a terminal EU via the switches 107B, 75B, 103B, 85A, 82B and 75E when the switch 75E is in its position opposite that shown in FIG. 4. The electromagnet 107II is connected to a terminal EV via the switch 107C and the switch 76C when the switch 107C is in its position shown in FIG. 4 and the switch 76C is in its position opposite that shown in FIG. 4. The electromagnet 107II is connected to a terminal EW via the switch 107C and the switch 77C when the switch 77C is in its position opposite that shown in FIG. 4. The electromagnet 107II is connected to a terminal EX via the switch 103C when said switch is in its position opposite that shown in FIG. 4, and to a terminal EY via the switch 75C when said switch is in its position opposite that shown in FIG. 4. The electromagnet 107II is connected to a terminal EZ via the switches 107C and 103D when the switch 107C is in its position shown in FIG. 4 and the switch 103D is in its position opposite that shown in FIG. 4, and to a terminal EAA via the switches 107C and 75D when the switch 75D is in its position opposite that shown in FIG. 4.

The electromagnets 107I and 107III are connected in a closed loop with a suitable voltage source 109 and a variable resistor 111. The lead 96 is connected to the terminal EM via the electromagnet 107V and the switch 76D when said switch is in its position opposite that shown in FIG. 4, and to the terminal EN via the electromagnet 107IV and the switch 77D when the switch 77D is in its position opposite that shown in FIG. 4. The electromagnet 107IV is connected to the terminal EK via the switches 107D, 107C and 76B when the switches 107D and 76B are in their positions opposite those shown in FIG. 4 and the switch 107C is in its position shown in FIG. 4. The electromagnet 107IV is connected to the terminal EL via the switches 107D, 107C and 77B when the switch 77B is in its position opposite that shown in FIG. 4. The electromagnet 107IV is connected to the terminal EV via the switches 107D and 76C when said switches are in their positions opposite those shown in FIG. 4, to the terminal EW via the switches 107D and 77C when said switches are in their positions opposite those shown in FIG. 4, to the terminal EZ via the switches 107D and 103D when said switches are in their positions opposite those shown in FIG. 4, and to the terminal EAA via the switches 107D and 75D when said switches are in their positions opposite those shown in FIG. 4. The electromagnet 107IV is connected to the terminal ET via the switch 103E when said switch is in its position opposite that shown in FIG. 4, and to the terminal EU via the switch 75E when the switch 75E is in its position opposite that shown in FIG. 4.

The lead 96 is connected to a point at ground potential via the relay winding 83II and the switches 78B, 77E and 83G when the switch 77E is in its position shown in FIG. 4 and the switches 78B and 83G are in their positions opposite those shown in FIG. 4. The relay winding 83II is connected to a terminal EAB via the switches 78B and 103F when the switch 78B is in its position shown in FIG. 4 and the switch 103F is in its position opposite that shown in FIG. 4. The relay winding 83II is connected to a terminal EAC via the switch 76E when said switch is in its position opposite that shown in FIG. 4. The relay winding 83II is connected to a terminal EAD via the switch 77F when said switch is in its position opposite that shown in FIG. 4. The relay winding 83II is connected to a terminal EAE via the switch 75F when said switch is in its position opposite that shown in FIG. 4.

The lead 96 is connected to terminals EAF and EAG via the relay winding 77II and the switches 85B and 77G, when the switch 85B is in its position shown in FIG. 4 and the switch 77G is in its position opposite that shown in FIG. 4. The lead 96 is connected to a terminal EAH via the switch 85C when said switch is in its position opposite that shown in FIG. 4. The lead 96 is connected to terminals EAI and EAJ via the relay winding 76II and the switch 76F when said switch is in its position opposite that shown in FIG. 4. The lead 96 is connected to terminal EAK via the relay winding 76I and the switches 78C and 83F when the switch 78C is in its position opposite that shown in FIG. 4 and the switch 83F is in its position shown in FIG. 4. A terminal EAL is connected to a point at ground potential via the switches 85E, 78E and 85D when the switches 85E and 78E are in their positions opposite those shown in FIG. 4 and the switch 85D is in its position shown in FIG. 4. The terminal EAL is connected to the lead 96 via the switches 85E, 78E, 85D, 77I and 82F and the relay winding 86, when the switches 85E, 78E, 85D and 82F are in their positions opposite those shown in FIG. 4 and the switch 77I is in its position shown in FIG. 4. The terminal EAL is connected to signal equipment 112 via the switches 85E, 78E and 85D when said switches are in their positions opposite those shown in FIG. 4. A terminal EAM is connected to the lead 96 via the switches 85E, 78E, 85D, 77I and 82F and the relay winding 86, when the switches 85E and 77I are in their positions shown in FIG. 4 and the switches 78E, 85D and 82F are in their positions opposite those shown in FIG. 4. The terminal EAM is connected to signal equipment 112 via the switches 85E, 78E and 85D when the switch 85E is in its position shown in FIG. 4 and the switches 78E and 85D are in their positions opposite those shown in FIG. 4.

The signal equipment 112 is connected to a point at ground potential via a switch 78D when said switch is in its position opposite that shown in FIG. 4. The lead 96 is connected to a terminal EAN via a variable resistor 113 and via the relay winding 85I and the switches 85F and 82D when said switches are in their positions shown in FIG. 4. A transistor 114 has an emitter electrode connected to the terminal EAN via an emitter resistor 115 and a lead 116. The transistor 114 has a collector electrode connected to the lead 96 via a diode 117. The transistor 114 has a base electrode connected to the tap of the variable resistor 113 via a resistor 118 and the switch 82E when said switch is in its position shown in FIG. 4. The base electrode of the transistor 114 is connected to the lead 116 via a resistor 119 and the tap of the variable resistor 113 is connected to the lead 116 via the switch 82E and a capacitor 121 when said switch is in its position shown in FIG. 4. A terminal EAO is connected to a point at ground potential via a switch 76G when said switch is in its position opposite that shown in FIG. 4. A terminal EAP is connected ot a point at ground potential via a switch 77H when said switch is in its position opposite that shown in FIG. 4.

The terminal EF of the office line repeater 15 is connected to the terminal FF of the office line repeater connector 16 and a terminal FA of said office line repeater connector is connected to a terminal GA of the switching unit 17. The terminal EG of the office line repeater 15 is connected to the terminal FG of the office line repeater connector 16 and a terminal FB of said office line repeater connector is connected to a terminal GB of the switching unit 17. The terminal EH of the office line repeater 15 is connected to the terminal FH of the office line repeater connector 16 and a terminal FC of said office line repeater connector is connected to a terminal GC of the switching unit 17. The terminal EI of the office line repeater 15 is connected to the terminal FI of the office line repeater connector 16 and a terminal FD of said office line repeater connector is connected to a terminal GD of the switching unit 17. The terminal EJ of the office line repeater 15 is connected to the terminal FJ of the office line repeater connector 16 and a terminal FE of said office line repeater connector is connected to a terminal GGE of the switching unit 17.

The terminals EA, EB, EK, EL, EV, EW, EM, EN, EAC, EAD, EAF, EAA, EAI, EAL, EAM, EAO, EAP and EAN, respectively, of the office line repeater 15 are connected to corresponding terminals DA, DB, DK, DL, DV, DW, DM, DN, DAC, DAD, DAF, DAA, DAI, DAL, DAM, DAO, DAP and DAN, respectively, of the starting control circuit 25.

In FIG. 5, which is a starting control circuit 25, the terminals DAA, DAN, DK, DV, DM, DL, DW, DN, DAO, DAP, DA, DB, DAC, DAD, DAM, DAL, DAI and DAF, respectively, are connected to the corresponding terminals of the office line repeater 15 and the terminals DJ, DI, DNA, DMA, DKA and DLA, respectively, are connected to the corresponding terminals AJ, AI, AN, AM, AK and AL, respectively, of the subscriber circuit 12. The starting control circuit of FIG. 5 comprises a busy discriminating relay 131 having an energizing winding 131 and an armature or switch 131A, a busy tone control relay 132 having an energizing winding 132, a switching relay 133 having an energizing winding 133 and a plurality of armatures or switches 133A, 133B and 133C, a test differential relay 134 having a pair of energizing windings 134I and 134II and a plurality of armatures or switches 134A, 134B and 134C, a test differential relay 135 having a pair of energizing windings 135I and 135II and a plurality of armatures or switches 135A, 135B and 135C, a supplementary relay 136 having an energizing winding 136 and a plurality of armatures or switches 136A, 136B, 136C, 136D and 136E, a supplementary relay 137 having an energizing winding 137 and a plurality of armatures or switches 137A, 137B, 137C, 137D, 137E and 137F, a starting, delayed release, relay 138 having an energizing winding 138 and a plurality of armatures or switches 138A, 138B, 138C, 138D, 138E, 138F and 138G, a starting, delayed release, relay 139 having an energizing winding 139 and a plurality of armatures or switches 139A, 139B, 139C, 139D, 139E and 139F, an all busy relay 141 having an energizing winding 141 and a plurality of armatures or switches 141A, 141B, 141C, 141D and 141E, a time relay 142 having an energizing winding 142 and a plurality of armatures or switches 142A, 142B and 142C, a time control relay 143 having an energizing winding 143 and a plurality of armatures or switches 143A, 143B and 143C, and a time control relay 144 having an energizing winding 144 and a plurality of armatures or switches 144A, 144B and 144C.

In FIG. 5, the terminal DAA is connected to a point at ground potential via the switch 133A when said switch is in its position shown in FIG. 5. The terminal DAN is connected to a point at ground potential via the switch 133B when said switch is in its position shown in FIG. 5. The terminals DK, DV and DM are connected to a circuit comprising a capacitor 145 connected in series with a resistor 146 between the terminals DK and DV, a resistor 147 connected in series with a capacitor 148 between the terminals DV and DM, a capacitor 149 and a resistor 151 connected in series between the terminal DV and a point at ground potential and a variable resistor 152 connected between the terminals DK and DM. The terminal DV is connected directly to ground via the switch 138A when said switch is in its position opposite that shown in FIG. 5. The terminals DK and DM are connected directly to each other via the switch 134A or the switch 136A when either of these switches is in its position opposite that shown in FIG. 5.

The terminals DL, DW and DN are connected to a circuit comprising a capacitor 153 connected in series with a resistor 154 between the terminals DL and DW, a resistor 155 connected in series with a capacitor 156 between the terminals DW and DN, a capacitor 157 and a resistor 158 connected in series between the terminal DW and a point at ground potential and a variable resistor 159 connected between the terminals DL and DN. The terminal DW is connected directly to ground via the switch 139A when said switch is in its position opposite that shown in FIG. 5. The terminals DL and DN are connected directly to each other via the switch 135A or the switch 137A when either of these switches is in its position opposite that shown in FIG. 5. The terminal DAO is connected to a negative potential lead 161, which is connected to a source 162 of negative potential, via the switch 136B, either of the switches 138B and 141E and the relay winding 138, when the switch 136B is in its position shown in FIG. 5 and either of the switches 138B and 141E is in its position opposite that shown in FIG. 5.

The terminal DAP is connected to the negative potential lead 161, which extends from the source 162 of negative potential to the terminal DKA via the relay winding 141, via the switch 137B and the relay winding 139 when said switch is in its position shown in FIG. 5. The terminal DA is connected to the lead 161 via the switch 138C and the relay windings 134I and 134II when said switch is in its position opposite that shown in FIG. 5. The terminal DB is connected to the lead 161 via the switch 139B and the relay windings 135I and 135II when said switch is in its position opposite that shown in FIG. 5. The terminal DAC is connected to a point at ground potential via the switches 134B, 141A, 143A and 138A, when each of these switches is in its position opposite that shown in FIG. 5. The terminal DAD is connected to a point at ground potential via either of the switches 137C and 135B and the switches 144A and 139C, when either of the switches 137C and 135B is in its position opposite that shown in FIG. 5 and each of the switches 144A and 139C is in its position opposite that shown in FIG. 5.

The terminal DAM is connected to the lead 161 via the relay winding 142. The terminal DAL is connected to the lead 161 via the switch 141C and the signal indicator 23 when the switch 141C is in its position shown in FIG. 5. The terminal DAI is connected to a point at ground potential via either of the switches 138E and 141B and the switches 133C and 136E, when either of the switches 138E and 141B is in its position opposite that shown in FIG. 5 and both switches 133C and 136E are in their positions shown in FIG. 5. The terminal DAF is connected to the terminal DJ via the switches 142A and 137D when the switch 142A is in its position opposite that shown in FIG. 5 and the switch 137D is in its position shown in FIG. 5. The terminal DAF is connected to a point at ground potential via the switches 142A and 137D and a switch 139D when the switch 139D is in its position opposite that shown in FIG. 5 and the terminal DJ is directly connected to the point at ground potential via the switch 139D when said switch is in its position opposite that shown in FIG. 5.

A terminal DAR, connected to the line subscriber connector 13, is connected to a point at ground potential via either of the switches 143B and 141D when either of said switches is in its position shown in FIG. 5. A terminal DAS, connected to the line subscriber connector 13, is connected to a point at ground potential via a switch 144B when said switch is in its position shown in FIG. 5. The terminal DNA is connected to the lead 161 via the switch 142B and a resistor 163 when said switch is in its position shown in FIG. 5. The terminal DMA is connected to the lead 161 via the switch 131A and the resistor 163 when said switch is in its position shown in FIG. 5. The terminal DLA is connected to a point at ground potential via an inductive reactance or coil 164 and the relay winding 132. The terminal DI is connected to the lead 161 via the relay winding 131.

The negative potential lead 161 is connected to a point at ground potential via the relay winding 133 and a switch 165 when said switch is in its position opposite that shown in FIG. 5. The lead 161 is connected to a point at ground potential via the relay winding 143 and either of the switches 138F and 136D when the switch 136D is in its position opposite that shown in FIG. 5 and the switch 138F is in its position shown in FIG. 5. The lead 161 is connected back to itself via the relay winding 143, the switch 143C, a capacitor 166 and a resistor 167 when said switch is in its position opposite that shown in FIG. 5, and the resistor 167 and capacitor 166 are connected between the lead 161 and a point at ground potential via the switch 143C when said switch is in its position shown in FIG. 5. The lead 161 is connected to a point at ground potential via the relay winding 144 and either of the switches 139E and 137E when the switch 137E is in its position opposite that shown in FIG. 5 and the switch 139E is in its position shown in FIG. 5. The lead 161 is connected back to itself via the relay winding 144, the switch 144C, a capacitor 168 and a resistor 169 when said switch is in its position opposite that shown in FIG. 5, and the resistor 169 and capacitor 168 are connected between the lead 161 and a point at ground potential via the switch 144C when said switch is in its position shown in FIG. 5.

The lead 161 is connected to a point at ground potential via the relay winding 136, either of the switches 134C and 136C and the switch 138G, when either of the switches 134C and 136C and the switch 138G are in their positions opposite those shown in FIG. 5. The lead 161 is connected to a point at ground potential via the relay winding 137, either of the switches 135C and 137F and the switch 139F, when either of the switches 135C and 137F and the switch 139F are in their positions opposite those shown in FIG. 5. The lead 161 is connected to a point at ground potential via the auxiliary signal indicator 24 and a switch 142C when said switch is in its position opposite that shown in FIG. 5. Each of the signal indicator 23 and the auxiliary signal indicator 24 includes a lamp and a bell. The starting control circuit 25 of FIG. 5 includes not only the signal indicator 23 and the auxiliary signal indicator 24, but also the circuitry comprising the busy discriminating circuit 22.

FIG. 6 is a circuit diagram of the interconnected circuits of FIGS. 3, 4 and 5. In FIG. 6, N subscriber circuits, N connectors, N line subscriber connectors, N office line repeaters, N office line repeater connectors, N switching units and a starting control circuit are connected; only the first, second and Nth subscriber circuits, line subscriber connectors and office line repeaters being shown, and only the first and Nth connectors, office line repeater connectors and switching units being shown. The starting control circuit 25 is connected to each of the subscriber circuits 12, 12′ . . . 12″ and to each of the office line repeaters 15, 15′ . . . 15″. Each of the subscriber circuits 12, 12′ . . . 12″ is connected to all the connectors 19 . . . 19″ and to a corresponding one of the line subscriber connectors 13, 13′ . . . 13″, each line subscriber connector being connected to a corresponding one of the office line repeaters. The office line repeaters 15, 15′ . . . 15″ are interconnected and each of the office line repeaters is connected to all the office line repeater connectors 16 . . . 16″. Each switching unit 17 . . . 17″ is connected to a corresponding one of the office line repeater connectors. The terminals of the components which are connected are those indicated in FIGS. 3, 4 and 5.

When the subscribers' lines of the private branch exchange are not busy and a call is received in the office line 14, the call electrical signal is supplied to the call signal relay 81 (FIG. 4) of the office line repeater 15 of the branch. The call signal relay 81 is energized by the circuit—

(1) Office line 14, terminal ED, switching relay 88 switch 88A, call signal relay 81 winding 81, capacitor 101, connection relay 83 switch 83D, switching relay 88 switch 88B, terminal EC and office line 14 (FIG. 4).

Energization of the call signal relay 81 causes the energization of the signal holding relay 78 by the circuit—

(2) Ground, switch 74B of the holding relay 74, switch 81A of the call signal relay 81, the signal holding relay 78 winding 78 and the lead 96 to the source 97 of negative potential (FIG. 4).

The call signal relay 81 is energized intermittently in accordance with received calls on the office line 14, but the signal holding relay 78 is maintained energized by the holding circuit—

(3) Ground, switch 74B of the holding relay 74, switch 78A of the signal holding relay 78, the signal relay 78 winding 78 and the lead 96 to the source 97 of negative potential (FIG. 4).

When the signal holding relay 78 is energized, its switch 78B closes the connection relay 83 winding 83II to ground, its switch 78C closes the energizing circuit for the selection relay 76 winding 76I, its switch 78D energizes the signal equipment 112 by connecting it to ground, and its switch 78F prepares the signal equipment 94 for energization to signal subscribers (FIG. 4).

If there are incoming calls to more than one office line repeater simultaneously, one selection relay 76 is energized and the others are delayed in energization. The selection relay 76 is energized by the circuit—

(4) Ground, switch 136E of the supplementary relay 136, switch 133C of the switching relay 133, switch 141B of the all busy relay 141, the terminal DAI (FIG. 5), the terminals EAI, EAJ and EAK, the switch 83F of the connection relay 83, the switch 78C of the signal holding relay 78, the selection relay 76 winding 76I and the source 97 of negative potential via the lead 96 (FIG. 4).

The selection relay 76 remains energized until it is deenergized by the circuit—

(5) Ground, the switch 136E of the supplementary relay 136, the switch 133C of the switching relay 133, the switch 141B of the all busy relay 141, the terminal DAI (FIG. 5), the terminals EAI, EAJ and EAK, the switch 76F of the selection relay 76, the selection relay 76 winding 76II and the source 97 of negative potential via the lead 96 (FIG. 4).

When the selection relay 76 is energized, its switch 76A prepares the idle line selecting circuit of the line subscriber connector 13 via the terminals ER and BR, its switches 76B and 76D prepare the circuit of the electromagnetic motor switch 107 for denergization, its switch 76C prepares the circuit of the electromagnetic motor switch 107 for energization, its switch 76E prepares the energizing circuit of the connection relay 83 (FIG. 4), and its switch 76G closes to ground the circuit of the starting relay 138 of FIG. 5 via the terminals EAO and DAO.

The starting relay 138 of the starting control circuit (FIG. 5) is energized by the circuit—

(6) Ground, the switch 76G of the selection relay 76, the terminal EAO (FIG. 4), the terminal DAO, the switch 136B of the supplementary relay 136, either the switch 138B of the starting relay 138 or the switch 141E of the al busy relay 141, the winding 138 of the starting relay 138 and the source 162 of negative potential via the lead 161 (FIG. 5).

When the starting relay 138 is energized, its switch 138A closes and thereby energizes the circuit of the electromagnetic rotary switch 107 (FIG. 5) so that the motor of said switch is energized and rotates the wiper arm via the circuit—

(7) Ground, the switch 138A of the starting relay 138, the terminal DV (FIG. 5), the terminal EV, the switch 76C of the selection relay 76, either the switch 107C or the switch 107D of the rotary switch 107, either the energizing winding 107II or the energizing winding 107IV, and the source 97 of negative potential via the lead 96 FIG. 4).

When the starting relay 138 is energized, its switch 138B maintains the energizing circuit of said starting relay even if the all busy relay 141 is deenergized during the rotation of the motor, its switch 138C prepares the energizing circuit of the test relay 134 (FIG. 5), its switch 138D prepares the energizing circuit of the connection relay 83 of FIG. 4, its switch 138E maintains the energizing circuit of the selection relay 76 of FIG. 4 even if the all busy relay 141 is deenergized during the rotation of the motor, its switch 138F closes and thereby energizes the circuit of the time control relay 143, and its switch 138G prepares the energizing circuit of the supplementary relay 136 (FIG. 5).

The energizing windings 107I, 107II, 107III and 107IV of the rotary switch 107 (FIG. 4) are alternately excited via circuit No. 7 so that the motor drives the wipers and rotates them. This functions to connect the subscribers' lines in a predetermined order to the office lines. When the rotary switch 107 rotates and its rotary wiper is at its predetermined zero point, the switch 107C of the rotary electromagnetic motor-driven rotary switch 107 operates to energize the circuits of the rotary switch 107 via the circuit—

(8) Ground, the switch 138A of the starting relay 138, the terminal DV (FIG. 5), the terminal EV, the switch 76G of the selection relay 76, the switch 107C of the rotary switch 107, the energizing winding 107II of the rotary switch 107 and the source 97 of negative potential (FIG. 4), or from the switch 107C to the switch 107B of the rotary switch, the switch 75B of the transfer relay 75, the switch 103B of the relay 103, the switch 85A of the timer relay 85, the switch 82B of the relay 82, the energizing winding 107IV of the rotary switch 107 and the source 97 of negative potential (FIG. 4).

The switch 107A of the rotary switch 107 prepares the energization of the circuit of the relay 82 by the circuit—

(9) Ground, the switch 133A of the switching relay 133, the terminal DAA (FIG. 5), the terminal EAA, the switch 71D of the current supply relay 71, the switch 76H of the selection relay 76, the switch 107A of the rotary switch 107, the resistor 106, the relay 82 winding 82 and the source 97 of negative potential (FIG. 4).

When the relay 82 is energized and operates in one step, its switch 82A prepares the test circuit of the subscriber's line and its switch 82C (FIG. 4) maintains the energization of the relay 82 for one step operation via the circuit—

(10) Ground, the switch 133A of the switching relay 133, the terminal DAA (FIG. 5), the terminal EAA, the switch 71D of the current supply relay 71, the resistor 108, the switch 82C of the relay 82, the winding 82 of the relay 82 and the source 97 of negative potential (FIG. 4).

Since the switch 82B of the relay 82 opens the energizing circuit of the rotary switch 107, per circuit No. 8, it may be operated to reinstitute rotation of said rotary switch. After the rotary switch 107 (FIG. 4) tests for subscribers' lines which are not busy in the predetermined order of wiper arm contact, and contacts a subscriber's line which is not busy, the test relay 134 (FIG. 5) is energized via the circuit—

(11) Ground, the switch 38F of the relay 38, the switch 39D of the relay 39, the terminal AG (FIG. 3), the terminal BG, the corresponding rotary switch of the line subscribed connector 13, the terminal BS (FIG. 4), the terminal ES, the switch 77A of the selection relay 77, the terminal EA (FIG. 4), the terminal DA, the switch 138C of the starting relay 138, the windings 134I and 134II of the test relay 134 and the source 162 of negative potential (FIG. 5).

When the test relay 134 is energized, its switch 134A energizes the windings 107I, 107II, 107III and 107IV of the rotary switch 107 to stop the rotation of the motor-driven wiper of said rotary switch via the circuit—

(12) Ground, the switch 138A of the starting relay 138, the terminal DV (FIG. 5), the terminal EV, the switch 76C of the selection relay 76, the switch 107D of the rotary switch 107, the energizing winding 107IV of the rotary switch 107, and the source 97 of negative potential (FIG. 4), or the switch 76D of the selection relay 76 connected to the switch 76D, the terminal EM (FIG. 4), the terminal DM, the switch 134A of the test relay 134, the terminal DK (FIG. 5), the terminal EK, the switch 76B of the selection relay 76, the energizing winding 107II of the rotary switch 107, and the source 97 of negative potential (FIG. 4).

Circuit No. 12 is effective if the switch 107D of the rotary switch 107 is moved to its position opposite that shown in FIG. 4.

The switch 134B of the test relay 134 energizes the connection relay 83 of FIG. 4 via the circuit—

(13) Ground, the switch 138D of the starting relay 138, the switch 143A of the time control relay 143, the switch 141A of the all busy relay 141, the switch 134B of the test relay 134, the terminal DAC (FIG. 5), the terminal EAC, the switch 76E of the selection relay 76, the relay winding 83II of the connection relay 83, and the source 97 of negative potential (FIG. 4).

The connection relay 83 maintains itself energized by the circuit—

(14) Ground, the switch 83G of the connection relay 83, the switch 77E of the selection relay 77, the switch 78B of the signal holding relay 78, the connection relay 83 winding 83II, and the source 97 of negative potential (FIG. 4).

When the connection relay 83 is energized, its switches 83A and 83B close the leads 93 and 98 to prepare the subscriber's line, its switch 83C connects the selected subscriber line to ground and prevents its selection by other equipment.

The relay 38 (FIG. 3) is energized and the selected subscriber is prevented from making a call by the circuit—

(15) Ground, the switch 83C of the connection relay 83, the terminal EQ (FIG. 4), the terminal BQ, the corresponding rotary switch of the line subscriber connector 13, the terminal BE (FIG. 4), the terminal AE, the relay winding 37I of the relay 37, either the switch 37C of the relay 37 or the switch 38E of the relay 38, the relay 38 winding 38I, and the source 42 of negative potential (FIG. 3).

The relay 37 is energized a short time before the relay 38 is energized and maintains the energizing circuit of the relay 38 via the switch 37C of the relay 37 (FIG. 3). The switch 83D of the connection relay 83 prepares the circuit to the central office and the switch 83F of said relay functions to deenergize the winding 76I of the selection relay 76. Since the switch 83E of the connection relay 83 short-circuits the resistor 108, per circuit No. 10, the current flowing through the relay 82 winding 82 increases in magnitude and the relay 82 functions in two-step operation via the circuit—

(16) Ground, the switch 133A of the switching relay 133, the terminal DAA (FIG. 5), the terminal EAA, the switch 71D of the current supply relay 71, the switch 83E of the connection relay 83, the switch 82C of the relay 82, the relay 82 winding 82, and the source 97 of negative potential (FIG. 4).

If the relay 82 functions in two-step operation, its second step switches 82D and 82E of the relay 82 prepare the superintending time limit circuit of the transistor 114 for operation and such circuit is energized via the variable resistor 113. The second step switch 82G of the relay 82 energizes the call signal relay 81 in place of the switch 83D of the connection relay 83. The second step switch 82F of the relay 82 connects the signal interrupted relay 86 winding 86 to the signal equipment 112 and the relay 86 is intermittently energized by the circuit—

(17) Ground, the signal equipment 112, the switch 77I of the selection relay 77, the switch 82F of the relay 82, the relay 86 winding 86, and the source 97 of negative potential (FIG. 4).

The signal interrupted relay 86 is intermittently energized and deenergized at one second intervals and transmits a call signal to the selected subscriber line via the circuit—

(18) Ground, the switch 86B of the signal interrupted relay 86, the switch 74E of the holding relay 74, the switch 83B of the connection relay 83, the lead 98, the terminal EP, the terminal BP, the corresponding rotary switch of the line subscriber connector 13, the terminal BB (FIG. 4), the terminal AB, the lead 33, the terminal AD, the subscriber's handset 31, the terminal AC, the lead 32, the lead AA (FIG. 3), the terminal BA, the corresponding rotary switch of the line subscriber connector 13, the terminal BO, the terminal EO, the lead 93, the switch 83A of the connection relay 83, the switch 86A of the signal interrupted relay 86, the switch 78F of the signal holding relay 78, the resistor 95, and the signal equipment 94, which generates a call signal (FIG. 4).

When the switch 134C of the test relay 134 (FIG. 5) is operated, it energizes the supplementary relay 136 winding 136, which then maintains its energization via the switch 136C thereof via the circuit—

(19) Ground, the switch 138G of the starting relay 138, either the switch 134C of the test relay 134 or the switch 136C of the supplementary relay 136, the supplementary relay 136 winding 136, and the source 162 of negative potential (FIG. 5).

When the supplementary relay 136 is energized, its switch 136A connects the stop circuit of the rotary switch 107 after the switch 134A of the test relay 134, its switch 136D closes the circuit of the time control relay 143, and its switch 136E (FIG. 5) opens the energizing circuit of the selection relay 76 (FIG. 4) to deenergize said energizing circuit, per circuit No. 5. The switch 136B of the supplementary relay 136 deenergizes the starting relay 138, per circuit No. 6 (FIG. 5). When the connection relay 83 (FIG. 4) and the relay 38 (FIG. 3) are energized, the test relay 134 is deenergized, per circuit No. 11. When the starting relay 138 is deenergized, the supplementary relay 136 is deenergized, per circuit No. 19 (FIG. 5), and the starting control circuit 25 is disconnected and prepares for the next connection. The connection relay 83 remains energized and the signal interrupted relay 86 remains in intermittent operation (FIG. 4) and the time control circuit remains in operation.

If the selected subscriber, after the signal indication at his handset, lifts his telephone receiver, the current supply relay 71 is energized by the circuit—

(20) Ground, the winding 71I of the current supply relay 71, the winding 72I of the operation relay 72, the switch 83B of the connection relay 83, the lead 98, the terminal EP, the terminal BP, the corresponding rotary switch of the line subscriber connector 13, the terminal BB (FIG. 4), the terminal AB, the lead 33, the terminal AD, the subscriber's handset 31, the terminal AC, the lead 32, the terminal AA (FIG. 3), the terminal BA, the corresponding rotary switch of the line subscriber connector 13, the terminal BO, the terminal EO, the lead 93, the switch 83A of the connection relay 83, the switch 86A of the signal interrupted relay 86, the winding 72II of the operation relay 72, the winding 71II of the current supply relay 71, and the source 97 of negative potential (FIG. 4).

The operation relay 72 does not operate, since it is a different relay. When the current supply relay 71 is energized, its switch 71A energizes the holding relay 74, and energizes the winding 83I of the connection relay 83 via the circuit (FIG. 4)—

(21) Ground, the switch 71A of the current supply relay 71, the winding 74 of the holding relay 74, the switch 79A of the information relay 79, the winding 83I of the connection relay 83, and the source 97 of negative potential (FIG. 4).

When the current supply relay 71 is energized, its switch 71B deenergizes the operation relay 73 and its switch 71C connects the inductive reactance 99 to the line, closes the office line circuit and provides a reply signal to the central office. The relay 82 is deenergized by the switch 71D, per circuit No. 16. Deenergization of the relay 82 deenergizes the signal interrupted relay 86 so that it ceases its intermittent operation. The time limit relay 85 remains energized and maintains the time control circuit in operation.

When the holding relay 74 is energized via the switch 71A of the current supply relay 71, its switch 74A maintains the energizing circuit of the connection relay 83, its switch 74B deenergizes the signal holding relay 78, per circuit No. 3, its switch 74C prepares the energizing circuit of the switching relays 87, 88 and 89, and its switches 74D and 74E close the leads 93 and 98, respectively, to enable the incoming call to be transmitted to the subscriber (FIG. 4).

When the signal holding relay 78 is deenergized, its switch 78A opens its own holding circuit, its switch 78B opens the holding circuit of the connection relay 83 winding 83II, and its switches 78C, 78D, 78E open various circuits (FIG. 4). The relays then in operation are the relays 37 and 38 of the subscriber circuit 12 of FIG. 3 and the current supply relay 71, the holding relay 74, the connection relay 83 and the timer relay 85 of the office line repeater 15 of FIG. 4.

If a subscriber wishes to transfer the incoming call from his line to another subscriber's line, he momentarily depresses the cradle switch of his telephone handset. This energizes the operation relay 72 (FIG. 4) and one of the switching relays 87, 88 and 89 (FIG. 4) is energized and switches the incoming call to the new subscriber via the switching unit 17 (FIG. 2).

If the selected subscriber receives and completes the incoming call and returns his telephone receiver to his handset, the office line repeater 15 circuit is opened, the current supply relay 71 is deenergized, the holding relay 74 is short-circuited and deenergized by the switch 71A of said current supply relay, the connection relay 83 is deenergized by the switch 74A, and the office line repeater circuit is returned to its initial condition. The deenergization of the connection relay 83 causes its switch 83C to deenergize the relays 37 and 38 of the subscriber circuit of FIG. 3 and said subscriber circuit is returned to its initial condition.

If an incoming call arrives at a time when all the subscribers' lines of the private branch exchange are busy, the relay 38 (FIG. 3) is energized and disconnects the terminal AK from ground via its switch 38C, so that the lead 161 of the starting control circuit 25 of FIG. 5 is opened. This deenergizes the all busy relay 141 of the starting control circuit (FIG. 5) and thereby disconnects the busy condition discriminating circuit via the circuit—

(22) Ground, the terminal DKA, the winding 141 of the all busy relay 141, and the source 162 of negative potential (FIG. 5), by removing the ground connection via the switch 38C of the relay 38 (FIG. 3).

This opens the circuit of the selection relay 76 of FIG. 4 via the switch 141B of the all busy relay 141. If an incoming call is then received on the office line, the call signal from the central office energizes the call signal relay 81, per circuit No. 1 (FIG. 4). When the call signal relay 81 is energized, the signal holding relay 78 is energized, per circuit No. 2, and the holding circuit for said signal holding relay is closed, per circuit No. 3, so that the said signal holding relay remains energized (FIG. 4).

Regardless of the energization of the signal holding relay 78, the selection relay 76 remains deenergized, so that the line subscriber connector 13 does not selectively switch and actuates the signal indicator 23 of FIG. 5, during the time that all the subscribers' lines of the private branch exchange are busy. The signal indicator 23 is positioned at a common point relative to all the subscribers. The signal indicator 23 is actuated via the circuit—

(23) Ground, the switch 78D of the signal holding relay 78, the signal equipment 112, the switch 85D of the timer relay 85, the switch 78E of said signal holding relay, the switch 85E of said time relay, the terminal EAL (FIG. 4), the terminal DAL, the switch 141C of the all busy relay 141, the lamp and/or bell of the signal indicator 23, and the source 162 of negative potential (FIG. 5).

When the subscriber completes the received incoming call and returns his receiver to the cradle of his telephone handset, the relay 38 of FIG. 3 and the all busy relay 141 of FIG. 5 are deenergized via the switch 38C of the relay 38 via circuit No. 22. When the relay 38 is energized, the switch 38C thereof opens circuit No. 22 and the selection relay 76 is energized, per circuit No. 4. The subscriber is then selected as hereinbefore described, the call line is prepared and the call signal indication is produced. When the selected subscriber removes the receiver from the cradle of his handset, he is connected immediately with the calling party.

If a subscriber is selected and connected with the calling party, yet fails to pick up his telephone receiver after the incoming call signal indication has been produced, the system operates as follows. When the office line repeater is connected to the selected subscriber and the call signal indication is produced, in the aforementioned manner, the time control circuit, comprising the timer relay 85, the diode 117, the transistor 114, the resistors 115, 118 and 119, the variable resistor 113 and the capacitor 121, is operable (FIG. 4). When the relay 82 functions in a two-step operation, per circuit No. 16, its contact 82D opens the circuit after the timer relay 85 is deenergized and its contact 82E opens the charging circuit of the capacitor 121 and the base current circuit of the transistor 114 of said circuit. The capacitor 121 then discharges through the resistors 115, 118 and 119. The time limit set by the time control circuit may be varied by variation of the variable resistor 113 to vary the magnitude of the charging voltage of the capacitor 121.

The timer relay 85 continues to be energized through the discharge circuit of the capacitor 121 during the time that there is a base current flow in the transistor 114. As the base current decreases, the collector current decreases, and when the collector current has decreased to a predetermined level, the timer relay 85 is deenergized. When the timer relay 85 becomes deenergized, it indicates that the selected subscriber has not lifted his receiver and the time relay 142 of FIG. 5 is energized via the circuit—

(24) Ground, the switch 85D of the timer relay 85, the switch 78E of the signal holding relay 78, the switch 85E of the timer relay 85, the terminal EAM (FIG. 4), the terminal DAM, the winding 142 of the time relay 142, and the source 162 of negative potential (FIG. 5).

When the time relay 142 is energized, the auxiliary signal indicator 24 is actuated to provide a signal indication to all the subscribers that there is an incoming call which has not been responded to. The auxiliary signal indicator 24 is positioned in common for all the subscribers. The auxiliary signal indicator 24 is actuated via the circuit—

(25) Ground, the switch 142C of the time relay 142, the lamp and/or bell of the auxiliary signal indicator 24, the lead 161 and the source 162 of negative potential (FIG. 5).

When the auxiliary signal indicator 24 is actuated, it indicates to the subscribers that the called or selected subscriber has not responded to the signal at his handset. If the selected subscriber then lifts his receiver from the cradle of his handset, the relays 37 and 39 of the subscriber circuit (FIG. 3) are energized via the circuit—

(26) Ground, the handset 31, the terminal AC, the lead 32, the switch 38D of the relay 38, the winding 39I of the relay 39, the winding 37II of the relay 37, and the source 42 of negative potential (FIG. 3).

The relays 37 and 39 are maintained in energization by the circuit—

(27) Ground, the switch 39A of the relay 39, the switch 38B of the relay 38, the lead 33, the terminal AD, the handset 31, the terminal AC, the switch 38D of the relay 38, the winding 39I of the relay 39, the winding 37II of the relay 37, and the source 42 of negative potential (FIG. 3).

The switch 39B of the relay 39 of FIG. 3 operates to change the connecting line 52 or 53 from the starting control circuit 25 from either terminal AI or AJ to the other, and the switch 39D of the relay 39 operates to change the connecting line 44 or 45 from the line subscriber connector 13 from either terminal AF or AG to the other. The selection relay 77 is energized by the circuit—

(28) Ground, the switch 38A of the relay 38, the switch 37A of the relay 37, the switch 39B of the relay 39, the terminal AJ (FIG. 3), the terminal DJ, the switch 137D of the supplementary relay 137, the switch 142A of the time relay 142, the terminal DAF (FIG. 5), the terminals EAF, EAG and EAH, the switch 85C of the timer relay 85, the winding 77I of the selection relay 77, the lead 96, and the source 97 of negative potential (FIG. 4).

When the selection relay 77 is energized, it maintains its energization by its switch 77G and short-circuits one of its windings (FIG. 4) by the circuit—

(29) Ground, the switch 38A of the relay 38, the switch 37A of the relay 37, the switch 39B of the relay 39, the terminal AJ (FIG. 3), the terminal DJ, the switch 137D of the supplementary relay 137, the switch 142A of the time relay 142, the terminal DAF (FIG. 5), the terminal EAF, the switch 77G of the selection relay 77, the switch 85B of the timer relay 85, the winding 77II of the selection relay 77, the lead 96, and the source 97 of negative potential (FIG.4).

When the selection relay 77 is energized, its switch 77A closes the circuit between the terminals ES and EA of FIG. 4, its switches 77B, 77C and 77D close the rotary switch 107 circuit to the terminals EL, EW and EN, its switch 77F closes the circuit of the winding 83II to the terminal EAD, and its switch 77I opens the circuit of the signal interrupted relay 86 (FIG. 4). The switch 77E of the selection relay 77 opens the holding circuit of the winding 83II of the connection relay 83, per circuit No. 14, and said connection relay is deenergized (FIG. 4). The switch 77H of the selection relay 77 grounds the terminal EAP, so that the starting relay 139 is energized by the circuit—

(30) Ground, the switch 77H of the selection relay 77, the terminal EAP (FIG. 4), the terminal DAP, the switch 137B of the supplementary relay 137, the winding 139 of the starting relay 139, the lead 161, and the source 162 of negative potential (FIG. 5).

When the starting relay 139 is energized, its switch 139A closes the circuit of the rotary switch 107 via the circuit—

(31) Ground, the switch 139A of the starting relay 139, the terminal DW (FIG. 5), the terminal EW, the switch 77C of the selection relay 77, the switch 107C or 107D of the rotary switch 107, the electromagnet windings 107II or 107IV of said rotary switch and the source 97 of negative potential (FIG. 4).

When the starting relay 139 is energized, its switch 139B closes the circuit of the test relay 135, its switch 139C prepares the circuit of the connection relay 83 of FIG. 4, its switch 139D maintains the circuit of the selection relay 77, its switch 139E closes the circuit of the time control relay 144, and its switch 139F prepares the circuit of the supplementary relay 137 (FIG. 5).

When the rotary switch 107 is actuated by circuit No. 31, the electromagnets 107I, 107II, 107III and 107IV are alternately excited and rotate the wiper arm of said switch. When the wiper arm contacts the line of the selected subscriber, the test relay 135 of FIG. 5 is energized via the circuit—

(32) Ground, the switch 38F of the relay 38, the switch 39D of the relay 39, the terminal AF (FIG. 3), the terminal BF, the corresponding rotary switch of the line subscriber connector 13, the terminal BR, the terminal ER, the switch 76A of the selection relay 76, the switch 82A of the relay 82, the terminal EB (FIG. 4), the terminal DB, the switch 139B of the starting relay 139, the winding 135I of the test relay 135, the winding 135II of said test relay, the lead 161, and the source 162 of negative voltage (FIG. 5).

When the test relay 135 is energized, its switch 135A closes the circuits of the electromagnets 107I, 107II, 107III and 107IV of the rotary switch 107, to stop rotation of the wiper arm, via the circuit—

(33) Ground, the switch 139A of the starting relay 139, terminal DW (FIG. 5), the terminal EW, the switch 77C of the selection relay 77, the switch 107D of the rotary switch 107, the electromagnet 107IV of said rotary switch, and the source 97 of negative potential, and the switch 77D of the selection relay 77 connected to the switch 107D, the terminal EN (FIG. 4), the terminal DN, the switch 135A of the test relay 135, the terminal DL (FIG. 5), the terminal EL, the switch 77B of the selection relay 77, the electromagnet 107II of said rotary switch, and the source 97 of negative potential (FIG. 4).

When the test relay 135 is energized, its switch 135B energizes the connection relay 83 via the circuit—

(34) Ground, the switch 139C of the starting relay 139, the switch 144A of the time control relay 144, the switch 135B of the test relay 135, the terminal DAD (FIG. 5), the terminal EAD, the switch 77F of the selection relay 77, the winding 83II of the connection relay 83, and the source 97 of negative potential (FIG. 4).

When the connection relay 83 is energized, its switch 83A closes the lead 93 to the selected subscriber and its switch 83B closes the lead 98 to said subscriber. The current supply relay 71 and the operation relay 72 are energized via the circuit—

(35) Ground, the winding 71I of the current supply relay 71, the winding 72I of the operation relay 72, the switch 83B of the connection relay 83, the terminal EP (FIG. 4), the terminal BP, the corresponding rotary switch of the line subscriber connector 13, the terminal BB (FIG. 4), the terminal AB, the lead 33, the terminal AD, the handset 31, the terminal AC, the lead 32, the terminal AA, the terminal BA (FIG. 3), the corresponding rotary switch of said line subscriber connector, the terminal BO, the terminal EO, the switch 83A of the connection relay 83, the switch 86A of the signal interrupted relay 86, the winding 72II of the operation relay 72, the winding 71II of the current supply relay, and the source 97 of ground potential (FIG. 4).

The switch 83C of the connection relay 83 connects the selected subscriber line to ground via the terminal EQ and prevents the further selection of that line. The relay 37 remains energized and the relay 38 of FIG. 3 is energized via the circuit—

(36) Ground, the switch 83C of the connection relay 83, the terminal EQ, the terminal BQ, the corresponding rotary switch of the line subscriber connector 13, the terminal BE (FIG. 4), the terminal AE, the winding 37I of the relay 37, either the switch 37C of the relay 37 or the switch 38E of the relay 38, the winding 38I of the relay 38, and the source 42 of negative potential (FIG. 3).

When the relay 38 is energized, the energization circuit of the relay 39, per circuit No. 27, is opened by the switch 38B of the relay and by the switch 38D of the relay 38, and the relay 39 is deenergized and various circuits of the subscriber circuit are opened (FIG. 3). When the relay 39 is deenergized, the operation relay 72 is deenergized per circuit No. 35. When the relay 39 of FIG. 3 is denergized, so that the operation relay 72 of FIG. 4 is deenergized, the holding relay 74 is energized, via circuit No. 21, and the connection relay 83 is maintained energized.

When the current supply relay 71 is energized, its switch 71B opens the circuit of the operation relay 73, and its switch 71C connects the inductive reactance 99 into the line and closes the line to complete the connection to the selected subscriber, and its switch 71D opens the circuit of the relay 82, per circuit No. 16, and the relay 82 is deenergized. When the relay 82 is deenergized, the signal interrupted relay 86 is deenergized and ceases its intermittent operation. The timer relay 85 of the time control circuit is energized by the circuit.

(37) Ground, the switch 133B of the switching relay 133, the terminal DAN (FIG. 5), the terminal EAN, the lead 116, the switch 82D of the relay 82, the switch 85F of the timer relay 85, the winding 85I of the timer relay, the lead 96, and the source 97 of negative potential (FIG. 4).

The switch 85F of the timer relay 85 opens circuit No. 37 of the winding 85I of said relay, but maintains the energization of its winding 85II (FIG. 4). When the holding relay 74 is energized by the switch 71A of the current supply relay 71, its switch 74A maintains the energization of the connection relay 83, its switch 74B opens the holding circuit of the signal holding relay 78, per circuit No. 3, so that said signal holding relay is deenergized, the switch 74C prepares the circuits of the switching relays 87, and 88 and 89, and its switches 74D and 74E close the leads 93 and 98, respectively, to close the office line to the selected subscriber.

When the signal holding relay 78 is deenergized, its switch 78A opens its own holding circuit and its switches 78B, 78C, 78D, 78E and 78F open their operating circuits.

When the timer relay 85 is energized, its switches 85B and 85C open the holding circuit of the selection relay 77 and its switches 85D and 85E open the circuit of the time relay 142 of FIG. 5, per circuit No. 24. This deenergizes the time relay 142 and causes deactuation of the auxiliary signal indicator 24, per circuit No. 25.

If the switch 135C of the test relay 135 of FIG. 5 is operated to its position opposite that shown in FIG. 5, the supplementary relay 137 is energized by the circuit—

(38) Ground, the switch 139F of the starting relay 139, the switch 135C of the test relay 135, the winding 137 of the supplementary relay 137, and the source 162 of negative potential (FIG. 5).

The switch 137F of the supplementary relay 137 then maintains said relay energized. When the relay 38 of FIG. 3 is energized, it opens the circuit of the test relay 135, per circuit No. 32, and said test relay is deenergized.

When the supplementary relay 137 is energized, its switch 137A closes the stop circuit of the rotary switch 107 after the switch 135A of the test relay 135 is moved to its position shown in FIG. 5, its switch 137C closes the circuit of the connection relay 83 of FIG. 4 after the switch 135B of said test relay is moved to its position shown in FIG. 5, its switch 137D opens the holding circuit of the selection relay 77, per circuit No. 29, and said selection relay is deenergized, and its switch 137E closes the circuit of the time control relay 144 until the starting relay 139 is returned to its initial condition. The switch 37B of the supplementary relay 137 opens the circuit of the starting relay 139, per circuit No. 30, and said starting relay is deenergized. When the starting relay 139 is deenergized, the circuit of the supplementary relay 137 is open, per circuit No. 38, and the switches of said supplementary relay are operated to their positions for the deenergized condition of the said supplementary relay, so that the circuit is prepared for the next operation.

One of the subscribers then responds to the induction of the auxiliary signal indicator 24 and closes the circuit to the calling party when he lifts his telephone receiver from the cradle of his handset. The following operation is as hereinbefore described in the instance of the selection of a subscriber whose line is not busy to receive the incoming call. If more than one subscriber responds to the auxiliary signal indicator 24, so that two or more subscribers complete their calls and pick up their receivers to accept the new incoming call, the first subscriber to respond, in accordance with the predetermined switching order of the rotary switches of the line subscriber connector 13, is selected to receive the new incoming call. The other responding subscribers hear a busy signal when they raise their receivers after the auxiliary signal indicator 24 is deactuated.

When the time relay 142 of the starting control circuit 25 is deenergized, the busy signal is produced and transmitted to the other responding subscribers. The time relay 142 is deenergized by the circuit—

(39) Ground, the winding 132 of the busy time control relay 132, the inductive reactance 164, the terminal DLA (FIG. 5), the terminal AL, the switch 37B of the relay 37, the winding 38II of the relay 38, the switch 39C of the relay 39, the terminal AN (FIG. 3), the terminal DNA, the switch 142B of the time relay 142, the resistor 163, the lead 161, and the source 162 of negative potential (FIG. 5).

When the relay 38 is energized by circuit No. 39, the starting circuits are deenergized, the relays 39 and 37 are deenergized and the relay 38 is maintained energized by the circuit—

(40) Ground, the winding 132 of the busy tone control relay 132, the inductive reactance 164, the terminal DLA (FIG. 5), the terminal AL, the switch 37B of the relay 37, the resistor 58, the switch 38B, the lead 33, the terminal AD, the handset 31, the terminal AC, the lead 32, the switch 38D of the relay 38, the switch 37C of the relay 37, the winding 38I of the relay 38, and the source 42 of negative potential (FIG. 3).

When the busy tone control relay 132 is energized, per circuit No. 39, a busy tone is produced by any suitable known busy tone producing arrangement (not shown) and is induced in the inductive reactance or coil 164. The busy tone is then transmitted via circuit No. 40 to the responding subscribers other than the first in switching order.

When a responding subscriber returns his telephone receiver to his telephone handset, the holding circuit of the relay 38 is opened and the energizing circuit of the busy tone control relay 132 is opened, so that the relays 38 and 132 are deenergized. Any subscriber who picks up his telephone receiver in error, hears a busy tone transmitted to his line via circuits Nos. 39 and 40. The signal indication of the auxiliary signal indicator 24 is produced continuously until the new incoming call is responded to. Thus, if a subscriber removes the receiver of his handset before the selection relay 77 of the office line repeater of FIG. 4 is energized, he is connected with the calling party and the auxiliary signal indicator 24 is deactuated. Then, if a second subscriber responds, after the first, he hears a busy signal transmitted via circuits Nos. 39 and 40.

The system of the present invention is operable during non-business hours, when there is no switchboard operator in attendance. Recorded answering equipment may be utilized. When there is no switchboard operator in attendance such as, for example, at night, on weekends and on holidays, so that none of the subscribers are present, either, the switch 165 of the starting control circuit 25 (FIG. 5) is closed by an attendant. When the manually operated switch 165 is closed, the switching relay 133 is energized by the circuit—

(41) Ground, the switch 165, the winding 133 of the switching relay 133, the lead 161, and the source 162 of negative potential (FIG. 5).

When the switching relay 133 is energized, its switch 133A opens the circuit of the relay 82 of the office line repeater 15 of FIG. 4, its switch 133B opens the holding circuit of the timer relay 85, and its switch 133C opens the energizing circuit of the selection relay 76.

When an incoming call is on the office line, the timer relay 85 is deenergized and the energizing circuit of the selection relay 76 is open, so that the auxiliary signal indicator 24 is actuated in the same manner as hereinbefore described for the situation in which a selected subscriber, whose line is not busy, fails to lift his telephone receiver from the cradle of his telephone handset, after he receives a signal indication of an incoming call. Thus, if an auxiliary signal indicator 24 is positioned at a location when an attendant is present, incoming calls will be handled by the system of the present invention in the aforementioned manner and will be received by such attendant While the invention has been described by means of specific examples and in a specific embodiment, I do not wish to be limited thereto, for obvious modifications will occur to those skilled in the art without departing from the spirit and scope of the invention.

I claim:

1. A private branch telephone exchange having a plurality of subscribers each having a subscriber line and a telephone handset operatively connected to said line and an office line for transmitting incoming calls to the subscribers of said exchange, said exchange comprising routing means connected between said office line and said plurality of subscribers' lines for selectively routing incoming calls on said office line to said subscribers, said routing means including starting control means for controlling the operation of said routing means to route an incoming call to the first free subscriber's line in a predetermined switching pattern upon the arrival of said incoming call on said office line, said starting control means including busy discriminating means for determining the busy condition of said subscribers' lines and signal indicating means positioned in operative proximity with said subscribers and operatively controlled by said busy discriminating means to provide a discernible indication to said subscribers upon the arrival of said incoming call on said office line when all of said subscribers' lines are busy.

2. A private branch telephone exchange as claimed in claim 1, wherein upon the freeing of a subscriber line after operative control of said signal indicating means, said busy discriminating means controls said signal indicating means to discontinue said discernible indication and said starting control means controls the operation of said routing means to route said incoming call to the free subscriber line.

3. A private branch telephone exchange as claimed in claim 1, wherein said routing means includes notification means connected to each subscriber line for indicating the arrival of an incoming call to a subscriber selected by said starting control means, and wherein said starting control means includes timer means and auxiliary signal indicator means positioned in operative proximity with said subscribers and operatively controlled by said timer means to provide a discernible indication to said subscribers upon the passage of a predetermined period of time after the arrival of said incoming call on said office line without response by a subscriber having a free line after notification to said subscriber by said notification means.

4. A private branch telephone exchange as claimed in claim 3, wherein upon response by the subscriber selected by said starting control means, said timer means controls said auxiliary signal indicating means to discontinue said discernible indication.

5. A private branch telephone exchange as claimed in claim 3, wherein upon the freeing of a subscriber line after operative control of said signal indicating means, said busy discriminating means controls said signal indicating means to discontinue said discernible indication and said starting control means controls the operation of said routing means to route said incoming call to the free subscriber line.

6. A private branch telephone exchange having a plurality of subscribers each having a subscriber line and a telephone handset operatively connected to said line and an office line for transmitting incoming calls to the subscribers of said exchange, said exchange comprising routing means connected between said office line and said plurality of subscribers' lines for selectively routing incoming calls on said office line to said subscribers, said routing means including starting control means for controlling the operation of said routing means to route an incoming call to the first free subscriber's line in a predetermined switching pattern upon the arrival of said incoming call on said office line, said routing means including notification means connected to each subscriber line for indicating the arrival of an incoming call to a subscriber selected by said starting control means, and said starting control means including timer means and auxiliary signal indicator means positioned in operative proximity with said subscribers and operatively controlled by said timer means to provide a discernible indication to said subscribers upon the passage of a predetermined period of time after the arrival of said incoming call on said office line without response by a subscriber having a free line after notification to said subscriber by said notification means.

7. A private branch telephone exchange as claimed in claim 6, wherein upon response by the subscriber selected by said starting control means, said timer means controls said auxiliary signals indicating means to discontinue said discernible indication.

References Cited

UNITED STATES PATENTS

| | | | |
|---|---|---|---|
| 2,617,889 | 11/1952 | Borel et al. | 179—27 |
| 3,275,754 | 9/1966 | Howell et al. | 179—18 |
| 3,327,064 | 6/1967 | Braund et al. | 179—27 |

KATHLEEN H. CLAFFY, Primary Examiner

D. L. RAY, Assistant Examiner